(12) United States Patent
Li et al.

(10) Patent No.: US 12,342,016 B2
(45) Date of Patent: Jun. 24, 2025

(54) VIDEO DATA TRANSMISSION METHOD AND APPARATUS

(71) Applicant: HUAWEI TECHNOLOGIES CO., LTD., Guangdong (CN)

(72) Inventors: Ming Li, Shanghai (CN); Qi Liu, Shanghai (CN); Jiantao Song, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 19 days.

(21) Appl. No.: 18/175,254

(22) Filed: Feb. 27, 2023

(65) Prior Publication Data
US 2023/0224525 A1 Jul. 13, 2023

Related U.S. Application Data

(63) Continuation of application No. PCT/CN2020/112734, filed on Aug. 31, 2020.

(51) Int. Cl.
*H04N 21/24* (2011.01)
*H04N 21/235* (2011.01)
*H04N 21/236* (2011.01)

(52) U.S. Cl.
CPC ....... *H04N 21/2405* (2013.01); *H04N 21/235* (2013.01); *H04N 21/236* (2013.01)

(58) Field of Classification Search
None
See application file for complete search history.

(56) References Cited

U.S. PATENT DOCUMENTS

| 9,295,065 B2 | 3/2016 | Dahod et al. |
| 2010/0195977 A1* | 8/2010 | Bennett ............ H04N 21/43853 386/201 |
| 2014/0036999 A1* | 2/2014 | Ryu ..................... H04N 19/159 375/240.12 |

(Continued)

FOREIGN PATENT DOCUMENTS

| CN | 1592271 A | 3/2005 |
| CN | 1922833 A | 2/2007 |

(Continued)

OTHER PUBLICATIONS

Extended European Search Report in European Appln No. 20950951.2, dated May 23, 2023, 6 pages.

(Continued)

*Primary Examiner* — Michael B. Pierorazio
(74) *Attorney, Agent, or Firm* — Fish & Richardson P.C.

(57) ABSTRACT

Example video data transmission methods and apparatus are described. One example method includes receiving a plurality of data packets corresponding to a plurality of video frames by a network device from a server. The network device determines that a transmission phase of one or more data packets corresponding to each video frame in the plurality of video frames, and determines a corresponding priority based on the transmission phase of the one or more data packets corresponding to each video frame. The network device sends, based on the priority of the one or more data packets corresponding to each video frame, the one or more data packets corresponding to each video frame to a terminal device corresponding to each video frame.

20 Claims, 16 Drawing Sheets

(56) References Cited

U.S. PATENT DOCUMENTS

2014/0233413 A1    8/2014  Dahod et al.
2019/0141767 A1*   5/2019  Wang .................... H04W 76/15
2021/0127087 A1*   4/2021  Yoshimochi .............. G06T 7/11

FOREIGN PATENT DOCUMENTS

| CN | 101056318 A | 10/2007 |
| CN | 101184048 A | 5/2008 |
| CN | 101227366 A | 7/2008 |
| CN | 101426133 A | 5/2009 |
| CN | 106559715 B | 8/2019 |
| DE | 102017112464 A1 | 12/2018 |
| WO | 2018121865 A1 | 7/2018 |

OTHER PUBLICATIONS

International Search Report and Written Opinion in International Appln. No. PCT/CN2020/112734, mailed on May 31, 2021, 21 pages (with English translation).

* cited by examiner

VIDEO DATA TRANSMISSION METHOD AND APPARATUS

CROSS-REFERENCE TO RELATED APPLICATIONS

This application is a continuation of International Application No. PCT/CN2020/112734, filed on Aug. 31, 2020, the disclosure of which is hereby incorporated by reference in its entirety.

TECHNICAL FIELD

This application relates to the field of communications technologies, and in particular, to a video data transmission method and apparatus.

BACKGROUND

A current end-to-end system architecture for video scheduling is shown in FIG. 1. A mobile phone establishes a transmission control protocol (TCP) or a user datagram protocol (UDP) connection to a server by using a base station, and video data is delivered from the server to the mobile phone. Wired transmission is performed between the base station and the server, and data is transmitted by using a wired bearer. Wireless transmission is performed between the base station and the mobile phone, and data is transmitted by using a wireless bearer.

Because a wireless transmission resource is relatively limited and valuable, after a plurality of mobile phones access a wireless network, the base station schedules the wireless transmission resource to perform sharing allocation between the mobile phones, to meet a video rate requirement of the mobile phone, in other words, the plurality of mobile phones share the entire radio resource. Specifically, in an existing video scheduling solution, data received by the base station from the server is an IP packet or an ethernet packet. In a scheduling process, the base station performs fair scheduling based on different bearer priorities by using the received data packet as a smallest granularity.

However, in the foregoing scheduling manner, a transmission delay is generated for each service for which scheduling is performed, and the transmission delay is uncontrollable. With continuous development of communications technologies, a requirement for the transmission delay is increasingly high. For example, there are some new real-time video services in 5G that require a low transmission delay, for example, a cloud (cloudX) service such as a cloud gaming service or cloud virtual reality (VR) service.

In conclusion, the existing video scheduling manner cannot adapt to a scenario with a relatively high transmission delay requirement.

SUMMARY

This application provides a video data transmission method and apparatus, to provide an efficient and low-delay video transmission method.

According to a first aspect, an embodiment of this application provides a video data transmission method, including:

A network device receives a plurality of data packets corresponding to a plurality of video frames from a server. Each of the plurality of video frames includes one or more data packets. The network device determines a transmission phase of the one or more data packets corresponding to each video frame in the video frame. The transmission phase includes a frame header, a frame middle, or a frame tail. The network device determines, based on the transmission phase of the one or more data packets corresponding to each video frame, a priority of the one or more data packets corresponding to each video frame. The network device sends, based on the priority of the one or more data packets corresponding to each video frame, the one or more data packets corresponding to the video frame to a terminal device corresponding to the video frame.

Based on the foregoing method, in this embodiment of this application, scheduling is performed based on the video frame, a priority is determined based on a transmission phase corresponding to one or more data packets in the video frame, and one or more data packets in a video frame with a highest priority are sent, so that it can be ensured that transmission delay requirements of most users are met, fluency of playing most videos can be ensured, freezing can be reduced, and efficiency and low-delay performance of video data transmission can be improved.

In a possible implementation, a priority of one or more data packets in a frame tail in a corresponding video frame is greater than a priority of one or more data packets in a frame middle or a frame header in the corresponding video frame, and/or a priority of one or more data packets in a frame middle in a corresponding video frame is greater than a priority of one or more data packets in a frame header in the corresponding video frame.

Based on the foregoing method, this embodiment of this application describes priorities of one or more data packets in video frames in different transmission phases. For example, a priority of one or more data packets in a frame tail is greater than a priority of one or more data packets in a frame middle or a frame header, and/or a priority of one or more data packets in a frame middle is greater than a priority of one or more data packets in a frame header.

In a possible implementation, if a transmission phase of one or more data packets corresponding to each of a plurality of video frames is a frame header, the network device determines a scheduling waiting delay of the one or more data packets corresponding to each of the plurality of video frames. A priority of one or more data packets corresponding to a video frame with a large scheduling waiting delay is greater than a priority of one or more data packets corresponding to a video frame with a small scheduling waiting delay. The scheduling waiting delay includes duration between receiving one or more data packets in a frame header in a corresponding video frame by the network device and scheduling the one or more data packets by the network device.

Based on the foregoing method, this embodiment of this application describes a manner of determining a priority of one or more data packets corresponding to each of a plurality of video frames when a transmission phase of the one or more data packets corresponding to each of the plurality of video frames is a frame header. To be specific, when a transmission phase of one or more data packets corresponding to each of a plurality of video frames is a frame header, a priority corresponding to the one or more data packets in the video frame is further determined based on a scheduling waiting delay corresponding to the one or more data packets in the video frame. For example, a priority of one or more data packets corresponding to a video frame with a large scheduling waiting delay is greater than a priority of one or more data packets corresponding to a video frame with a small scheduling waiting delay.

In a possible implementation, if a transmission phase of one or more data packets corresponding to each of a plurality of video frames is a frame middle or a frame tail, the network device determines a frame sending delay of the one or more data packets corresponding to each of the plurality of video frames. Apriority of one or more data packets corresponding to a video frame with a large frame sending delay is greater than a priority of one or more data packets corresponding to a video frame with a small frame sending delay. The frame sending delay includes duration between sending one or more data packets in a frame header in a video frame by the network device and scheduling one or more data packets in a frame middle or a frame tail in the video frame by the network device.

Based on the foregoing method, this embodiment of this application describes a manner of determining a priority of one or more data packets corresponding to each of a plurality of video frames when a transmission phase of the one or more data packets corresponding to each of the plurality of video frames is a frame middle or a frame tail. To be specific, when a transmission phase of one or more data packets corresponding to each of a plurality of video frames is a frame middle or a frame tail, a priority corresponding to the one or more data packets in the video frame is further determined based on a frame sending delay corresponding to the one or more data packets in the video frame. For example, a priority of one or more data packets corresponding to a video frame with a large frame sending delay is greater than a priority of one or more data packets corresponding to a video frame with a small frame sending delay.

In a possible implementation, the network device sends handover instructions to a terminal device after the network device completes transmitting one or more data packets in a frame tail in a video frame corresponding to the terminal device.

Based on the foregoing method, when the network device needs to hand over a terminal device to another network device, to effectively ensure delay performance of a video frame being transmitted and prevent video play freezing caused by transmission interruption, only after meeting a specific condition, the network device is triggered to send handover instructions to the terminal device. For example, the condition is that the network device sends handover instructions to a terminal device after completing transmitting one or more data packets in a frame tail in a video frame corresponding to the terminal device.

In a possible implementation, the network device determines to hand over the terminal device to another network device. The network device determines whether transmission of the one or more data packets in the frame tail in the video frame corresponding to the terminal device is completed. After transmission of the one or more data packets in the frame tail in the video frame corresponding to the terminal device is completed, the network device sends the handover command to the terminal device.

Based on the foregoing method, when a terminal device needs to perform cell handover, the network device makes a joint decision based on a signaling plane and a user plane. To be specific, after determining that signal quality between the terminal device and a cell meets a handover condition, the network device further needs to determine whether transmission of the one or more data packets in the frame tail in the video frame corresponding to the terminal device is completed. If yes, the network device delays sending handover instructions to the terminal device. In other words, the network device comprehensively obtains, based on a transmission phase of the video frame, delay time for delivering the handover instructions, so that delay performance of a video frame being transmitted is effectively ensured without affecting the cell handover, thereby making a video more fluent.

In a possible implementation, the method further includes: If the network device does not complete transmitting the one or more data packets in the frame tail in the corresponding video frame after a third duration threshold is reached, the network device sends the handover instructions to the terminal device.

Based on the foregoing method, in this embodiment of this application, to avoid affecting the cell handover because of unlimited waiting for completing transmitting the one or more data packets in the frame tail in the video frame corresponding to the terminal device, the third duration threshold is set, so that after the network device determines to hand over the terminal device to another network device, if the network device still does not complete transmitting the one or more data packets in the frame tail in the corresponding video frame after the third duration threshold is reached, the network device directly sends the handover instructions.

According to a second aspect, an embodiment of this application provides a video data transmission method, including:

A network device receives a plurality of data packets corresponding to a plurality of video frames from a server. Each of the plurality of video frames includes one or more data packets. The network device determines, based on a scheduling waiting delay and/or a frame sending delay of the one or more data packets corresponding to each video frame, a priority of the one or more data packets corresponding to each video frame. The network device sends, based on the priority of the one or more data packets corresponding to each video frame, the one or more data packets corresponding to the video frame to a terminal device corresponding to the video frame. The one or more data packets corresponding to each video frame are in a frame header, a frame middle, or a frame tail phase in the video frame. If the one or more data packets are in a frame header in the corresponding video frame, a scheduling waiting delay of the one or more data packets corresponding to the video frame includes duration between receiving the one or more data packets by the network device and scheduling the one or more data packets by the network device; or if the one or more data packets are in a frame middle or a frame tail in the corresponding video frame, a frame sending delay of the one or more data packets corresponding to the video frame includes duration between sending one or more data packets in a frame header in the video frame by the network device and scheduling the one or more data packets in the frame middle or the frame tail in the video frame by the network device.

Based on the foregoing method, in this embodiment of this application, scheduling is performed based on the video frame, a priority is determined based on a scheduling waiting delay and/or a frame sending delay corresponding to one or more data packets in the video frame, and one or more data packets in a video frame with a highest priority are sent, so that it can be ensured that transmission delay requirements of most users are met, fluency of playing most videos can be ensured, freezing can be reduced, and efficiency and low-delay performance of video data transmission can be improved.

In a possible implementation, a priority of one or more data packets corresponding to a video frame with a large scheduling waiting delay is greater than a priority of one or more data packets corresponding to a video frame with a small scheduling waiting delay.

Based on the foregoing method, this embodiment of this application describes a manner of determining a priority of one or more data packets in the video frame. To be specific, a priority of one or more data packets corresponding to a video frame with a large scheduling waiting delay is greater than a priority of one or more data packets corresponding to a video frame with a small scheduling waiting delay.

In a possible implementation, a priority of one or more data packets corresponding to a video frame with a large frame sending delay is greater than a priority of one or more data packets corresponding to a video frame with a small frame sending delay.

Based on the foregoing method, this embodiment of this application describes a manner of determining a priority of one or more data packets in the video frame. To be specific, a priority of one or more data packets corresponding to a video frame with a large frame sending delay is greater than a priority of one or more data packets corresponding to a video frame with a small frame sending delay.

In a possible implementation, a priority of one or more data packets corresponding to a video frame with a frame sending delay is greater than a priority of one or more data packets corresponding to a video frame with a scheduling waiting delay.

Based on the foregoing method, this embodiment of this application describes a manner of comparing the priority of the one or more data packets in the video frame with the scheduling waiting delay and the priority of the one or more data packets in the video frame with the frame sending delay. To be specific, the priority of the one or more data packets corresponding to the video frame with the frame sending delay is greater than the priority of the one or more data packets corresponding to the video frame with the scheduling waiting delay.

In a possible implementation, if a frame sending delay of one or more data packets corresponding to each of a plurality of video frames is the same, the network device determines a transmission phase of the one or more data packets corresponding to each of the plurality of video frames. A priority of one or more data packets in a frame tail in a corresponding video frame is greater than a priority of one or more data packets in a frame middle in the corresponding video frame.

Based on the foregoing method, this embodiment of this application describes a manner of determining a priority of one or more data packets corresponding to each of a plurality of video frames when a frame sending delay of one or more data packets corresponding to each of the plurality of video frames is the same. For example, the network device determines a transmission phase of one or more data packets corresponding to each of the plurality of video frames. A priority of one or more data packets in a frame tail in a corresponding video frame is greater than a priority of one or more data packets in a frame middle in the corresponding video frame.

In a possible implementation, a priority of one or more data packets corresponding to a video frame whose scheduling waiting delay reaches a first duration threshold is greater than a priority of one or more data packets corresponding to a video frame whose frame sending delay does not reach a second duration threshold. The first duration threshold is maximum duration between receiving one or more data packets in a frame header in a corresponding video frame by the network device and scheduling the one or more data packets by the network device, and the second duration threshold is maximum duration between sending one or more data packets in a frame header in a video frame by the network device and scheduling one or more data packets in a frame middle or a frame tail in the video frame by the network device.

Based on the foregoing method, this embodiment of this application describes a manner of comparing a priority of one or more data packets in a video frame with a scheduling waiting delay and a priority of one or more data packets in a video frame with a frame sending delay. To be specific, the priority of the one or more data packets corresponding to the video frame whose scheduling waiting delay reaches the first duration threshold is greater than the priority of the one or more data packets corresponding to the video frame whose frame sending delay does not reach the second duration threshold.

In a possible implementation, the network device sends handover instructions to a terminal device after the network device completes transmitting one or more data packets in a frame tail in a video frame corresponding to the terminal device.

Based on the foregoing method, when the network device needs to hand over a terminal device to another network device, to effectively ensure delay performance of a video frame being transmitted and prevent video play freezing caused by transmission interruption, only after meeting a specific condition, the network device is triggered to send handover instructions to the terminal device. For example, the condition is that the network device sends handover instructions to a terminal device after completing transmitting one or more data packets in a frame tail in a video frame corresponding to the terminal device.

In a possible implementation, the network device determines to hand over the terminal device to another network device.

The network device determines whether transmission of the one or more data packets in the frame tail in the video frame corresponding to the terminal device is completed. After transmission of the one or more data packets in the frame tail in the video frame corresponding to the terminal device is completed, the network device sends the handover command to the terminal device.

Based on the foregoing method, when a terminal device needs to perform cell handover, the network device makes a joint decision based on a signaling plane and a user plane. To be specific, after determining that signal quality between the terminal device and a cell meets a handover condition, the network device further needs to determine whether transmission of the one or more data packets in the frame tail in the video frame corresponding to the terminal device is completed. If yes, the network device delays sending handover instructions to the terminal device. In other words, the network device comprehensively obtains, based on a transmission phase of the video frame, delay time for delivering the handover instructions, so that delay performance of a video frame being transmitted is effectively ensured without affecting the cell handover, thereby making a video more fluent.

In a possible implementation, the method further includes: If the network device does not complete transmitting the one or more data packets in the frame tail in the corresponding video frame after a third duration threshold is reached, the network device sends the handover instructions to the terminal device.

Based on the foregoing method, in this embodiment of this application, to avoid affecting the cell handover because of unlimited waiting for completing transmitting the one or more data packets in the frame tail in the video frame corresponding to the terminal device, the third duration threshold is set, so that after the network device determines to hand over the terminal device to another network device, if the network device still does not complete transmitting the one or more data packets in the frame tail in the corresponding video frame after the third duration threshold is reached, the network device directly sends the handover instructions.

According to a third aspect, an embodiment of this application provides a video data transmission method, including:

A network device sends handover instructions to a terminal device after the network device completes transmitting one or more data packets in a frame tail in a video frame corresponding to the terminal device.

Based on the foregoing method, when the network device needs to hand over a terminal device to another network device, to effectively ensure delay performance of a video frame being transmitted and prevent video play freezing caused by transmission interruption, only after meeting a specific condition, the network device is triggered to send handover instructions to the terminal device. For example, the condition is that the network device sends handover instructions to a terminal device after completing transmitting one or more data packets in a frame tail in a video frame corresponding to the terminal device.

In a possible implementation, the network device determines to hand over the terminal device to another network device.

The network device determines whether transmission of the one or more data packets in the frame tail in the video frame corresponding to the terminal device is completed. After transmission of the one or more data packets in the frame tail in the video frame corresponding to the terminal device is completed, the network device sends the handover command to the terminal device.

Based on the foregoing method, when a terminal device needs to perform cell handover, the network device makes a joint decision based on a signaling plane and a user plane. To be specific, after determining that signal quality between the terminal device and a cell meets a handover condition, the network device further needs to determine whether transmission of the one or more data packets in the frame tail in the video frame corresponding to the terminal device is completed. If yes, the network device delays sending handover instructions to the terminal device. In other words, the network device comprehensively obtains, based on a transmission phase of the video frame, delay time for delivering the handover instructions, so that delay performance of a video frame being transmitted is effectively ensured without affecting the cell handover, thereby making a video more fluent.

In a possible implementation, if the network device does not complete transmitting the one or more data packets in the frame tail in the corresponding video frame after a third duration threshold is reached, the network device sends the handover instructions to the terminal device.

Based on the foregoing method, in this embodiment of this application, to avoid affecting the cell handover because of unlimited waiting for completing transmitting the one or more data packets in the frame tail in the video frame corresponding to the terminal device, the third duration threshold is set, so that after the network device determines to hand over the terminal device to another network device, if the network device still does not complete transmitting the one or more data packets in the frame tail in the corresponding video frame after the third duration threshold is reached, the network device directly sends the handover instructions.

According to a fourth aspect, an embodiment of this application further provides a video data transmission apparatus. The apparatus may be configured to perform operations in any one of the first aspect and the possible implementations of the first aspect.

For example, the apparatus may include modules or units configured to perform the operations in any one of the first aspect and the possible implementations of the first aspect. For example, the apparatus includes a transceiver module and a processing module. The transceiver module and the processing module specifically perform the following content.

The transceiver module is configured to receive a plurality of data packets corresponding to a plurality of video frames. Each of the plurality of video frames includes one or more data packets.

The processing module is configured to: determine a transmission phase of the one or more data packets corresponding to each video frame in the video frame, where the transmission phase includes a frame header, a frame middle, or a frame tail; and determine, based on the transmission phase of the one or more data packets corresponding to each video frame, a priority of the one or more data packets corresponding to each video frame.

The transceiver module is further configured to send, based on the priority of the one or more data packets corresponding to each video frame, the one or more data packets corresponding to the video frame to a terminal device corresponding to the video frame.

In a possible implementation, a priority of one or more data packets in a frame tail in a corresponding video frame is greater than a priority of one or more data packets in a frame middle or a frame header in the corresponding video frame, and/or a priority of one or more data packets in a frame middle in a corresponding video frame is greater than a priority of one or more data packets in a frame header in the corresponding video frame.

In a possible implementation, the processing module is specifically configured to: if a transmission phase of one or more data packets corresponding to each of a plurality of video frames is a frame header, determine a scheduling waiting delay of the one or more data packets corresponding to each of the plurality of video frames. A priority of one or more data packets corresponding to a video frame with a large scheduling waiting delay is greater than a priority of one or more data packets corresponding to a video frame with a small scheduling waiting delay. The scheduling waiting delay includes duration between receiving one or more data packets in a frame header in a corresponding video frame by the network device and scheduling the one or more data packets by the network device.

In a possible implementation, the processing module is specifically configured to:
  if a transmission phase of one or more data packets corresponding to each of a plurality of video frames is a frame middle or a frame tail, determine a frame sending delay of the one or more data packets corresponding to each of the plurality of video frames. A priority of one or more data packets corresponding to a video frame with a large frame sending delay is greater than a priority of one or more data packets corresponding to a video frame with a small frame sending delay. The frame sending delay includes duration between sending one or more data packets in a frame header in a video frame by the network device and scheduling one or more data packets in a frame middle or a frame tail in the video frame by the network device.

In a possible implementation, the processing module sends handover instructions to a terminal device after completing transmitting one or more data packets in a frame tail in a video frame corresponding to the terminal device.

In a possible implementation, the processing module is specifically configured to:

determine to hand over the terminal device to another network device; determine whether transmission of the one or more data packets in the frame tail in the video frame corresponding to the terminal device is completed; and after transmission of the one or more data packets in the frame tail in the video frame corresponding to the terminal device is completed, send the handover command to the terminal device.

In a possible implementation, the processing module is further configured to:

if the processing module does not complete transmitting the one or more data packets in the frame tail in the corresponding video frame after a third duration threshold is reached, send the handover instructions to the terminal device.

According to a fifth aspect, an embodiment of this application further provides a video data transmission apparatus. The apparatus may be configured to perform operations in any one of the second aspect and the possible implementations of the second aspect.

For example, the apparatus may include modules or units configured to perform the operations in any one of the second aspect and the possible implementations of the second aspect. For example, the apparatus includes a transceiver module and a processing module. The transceiver module and the processing module specifically perform the following content.

The transceiver module is configured to receive a plurality of data packets corresponding to a plurality of video frames from a server. Each of the plurality of video frames includes one or more data packets.

The processing module is configured to: determine, based on a scheduling waiting delay and/or a frame sending delay of the one or more data packets corresponding to each video frame, a priority of the one or more data packets corresponding to each video frame; and send, based on the priority of the one or more data packets corresponding to each video frame, the one or more data packets corresponding to the video frame to a terminal device corresponding to the video frame.

The transceiver module is further configured to send, based on the priority of the one or more data packets corresponding to each video frame, the one or more data packets corresponding to the video frame to a terminal device corresponding to the video frame.

The one or more data packets corresponding to each video frame are in a frame header, a frame middle, or a frame tail phase in the video frame. If the one or more data packets are in a frame header in the corresponding video frame, a scheduling waiting delay of the one or more data packets corresponding to the video frame includes duration between receiving the one or more data packets by the network device and scheduling the one or more data packets by the network device; or if the one or more data packets are in a frame middle or a frame tail in the corresponding video frame, a frame sending delay of the one or more data packets corresponding to the video frame includes duration between sending one or more data packets in a frame header in the video frame by the network device and scheduling the one or more data packets in the frame middle or the frame tail in the video frame by the network device.

In a possible implementation, the processing module is further configured to:

a priority of one or more data packets corresponding to a video frame with a large scheduling waiting delay is greater than a priority of one or more data packets corresponding to a video frame with a small scheduling waiting delay.

In a possible implementation, the processing module is further configured to:

a priority of one or more data packets corresponding to a video frame with a large frame sending delay is greater than a priority of one or more data packets corresponding to a video frame with a small frame sending delay.

In a possible implementation, a priority of one or more data packets corresponding to a video frame with a frame sending delay is greater than a priority of one or more data packets corresponding to a video frame with a scheduling waiting delay.

In a possible implementation, the processing module is specifically configured to:

if a frame sending delay of one or more data packets corresponding to each of a plurality of video frames is the same, the network device determines a transmission phase of the one or more data packets corresponding to each of the plurality of video frames. A priority of one or more data packets in a frame tail in a corresponding video frame is greater than a priority of one or more data packets in a frame middle in the corresponding video frame.

In a possible implementation, the processing module is specifically configured to: a priority of one or more data packets corresponding to a video frame whose scheduling waiting delay reaches a first duration threshold is greater than a priority of one or more data packets corresponding to a video frame whose frame sending delay does not reach a second duration threshold. The first duration threshold is maximum duration between receiving one or more data packets in a frame header in a corresponding video frame by the network device and scheduling the one or more data packets by the network device, and the second duration threshold is maximum duration between sending one or more data packets in a frame header in a video frame by the network device and scheduling one or more data packets in a frame middle or a frame tail in the video frame by the network device.

In a possible implementation, the processing module is further configured to:

send handover instructions to a terminal device after completing transmitting one or more data packets in a frame tail in a video frame corresponding to the terminal device.

In a possible implementation, the processing module is specifically configured to:

determine to hand over the terminal device to another network device; determine whether transmission of the one or more data packets in the frame tail in the video frame corresponding to the terminal device is completed; and after transmission of the one or more data packets in the frame tail in the video frame corresponding to the terminal device is completed, send the handover command to the terminal device.

In a possible implementation, the processing module is further configured to:

if the processing module does not complete transmitting the one or more data packets in the frame tail in the corresponding video frame after a third duration threshold is reached, send the handover instructions to the terminal device.

According to a sixth aspect, an embodiment of this application further provides a video transmission apparatus. The apparatus may be configured to perform operations in any one of the third aspect and the possible implementations of the third aspect.

For example, the apparatus may include modules or units configured to perform the operations in any one of the third aspect and the possible implementations of the third aspect. For example, the apparatus includes a transceiver module and a processing module. The transceiver module and the processing module specifically perform the following content.

The processing module is configured to determine that transmission of one or more data packets in a frame tail in a video frame corresponding to a terminal device is completed.

The transceiver module is configured to send handover instructions to the terminal device.

In a possible implementation, the processing module is specifically configured to:

determine to hand over the terminal device to another network device; determine whether transmission of the one or more data packets in the frame tail in the video frame corresponding to the terminal device is completed; and after transmission of the one or more data packets in the frame tail in the video frame corresponding to the terminal device is completed, send the handover command to the terminal device.

In a possible implementation, the processing module is further configured to:

if the processing module does not complete transmitting the one or more data packets in the frame tail in the corresponding video frame after a third duration threshold is reached, send the handover instructions to the terminal device.

According to a seventh aspect, an embodiment of this application provides a chip system. The chip system includes a processor, and optionally, further includes a memory. The memory is configured to store a computer program, and the processor is configured to invoke the computer program from the memory and run the computer program, so that a video transmission apparatus in which the chip system is installed performs any method in any one of the first aspect to the third aspect and the possible implementations of the first aspect to the third aspect.

According to an eighth aspect, an embodiment of this application provides a computer program product. The computer program product includes computer program code. When the computer program code is run by a transceiver module and a processing module or a transceiver and a processor of a video transmission apparatus, the video transmission apparatus performs any method in any one of the first aspect to the third aspect and the possible implementations of the first aspect to the third aspect.

According to a ninth aspect, an embodiment of this application provides a computer-readable storage medium. The computer-readable storage medium stores a program, and the program causes the video transmission apparatus to perform any method in any one of the first aspect to the third aspect and the possible implementations of the first aspect to the third aspect.

DESCRIPTION OF EMBODIMENTS

Figure 1:
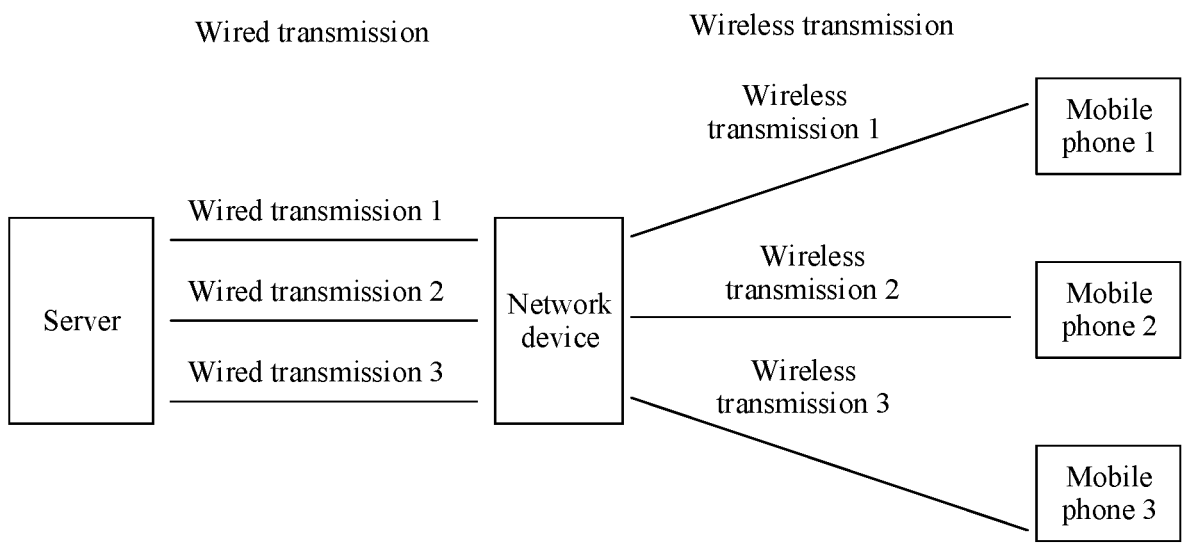
FIG. 1 is a schematic diagram of an end-to-end system architecture of existing video data transmission.

A current end-to-end system architecture for video data transmission is shown in FIG. 1. A mobile phone establishes a TCP or a UDP connection to a server by using a base station, and video data is delivered from the server to the mobile phone. Wired transmission is performed between the base station and the server, and data is transmitted by using a wired bearer (where the bearer refers to a virtual data channel). Wireless transmission is performed between the base station and the mobile phone, and data is transmitted by using a wireless bearer.

Because a wireless transmission resource is relatively limited and valuable, after a plurality of mobile phones access a wireless network, the base station schedules the wireless transmission resource to perform sharing allocation between the mobile phones, to meet a video rate requirement of the mobile phone, in other words, the plurality of mobile phones share the entire radio resource.

Figure 2:
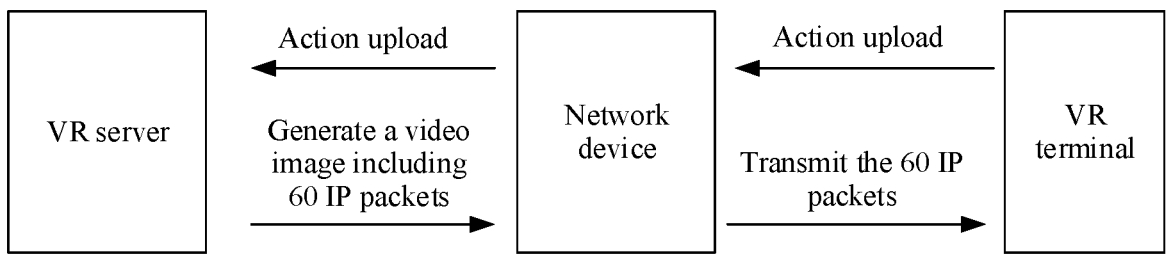
FIG. 2 is a schematic diagram of a service scenario such as existing VR.

For example, when video data is transmitted in a VR service scenario, as shown in FIG. 2, a VR terminal generates an action signal, and uploads the action signal to a VR server by using a network device. The VR server generates a video image based on the action signal, and sends, in real time by using the network device, the image to the VR terminal for display.

For example, one image has 60 internet protocol (IP) packets, which may mean that one video frame includes 60 data packets. In addition, during transmission, a corresponding terminal device can obtain a complete image through decoding only after receiving all data packets corresponding to the video frame.

Currently, there are mainly the following several manners of transmitting video data.

Manner 1: Data received by a network device from a server is an IP packet or an ethernet packet, and scheduling is performed by using the IP packet or the ethernet packet as a smallest granularity. When the network device schedules a received IP packet or ethernet packet, the network device perceives only a bearer priority of a terminal device, and performs transmission based on the bearer priority of the terminal device.

When priorities of terminal devices communicating with the network device are different, the network device performs transmission based on the priorities of the terminal devices communicating with the network device. To be specific, transmission is preferentially performed for a terminal device with a higher priority, and then transmission is performed for a terminal device with a lower priority.

When priorities of at least two of the terminal devices communicating with the network device are the same, the network device performs fair transmission for the terminal devices with the same priority.

Figure 3:
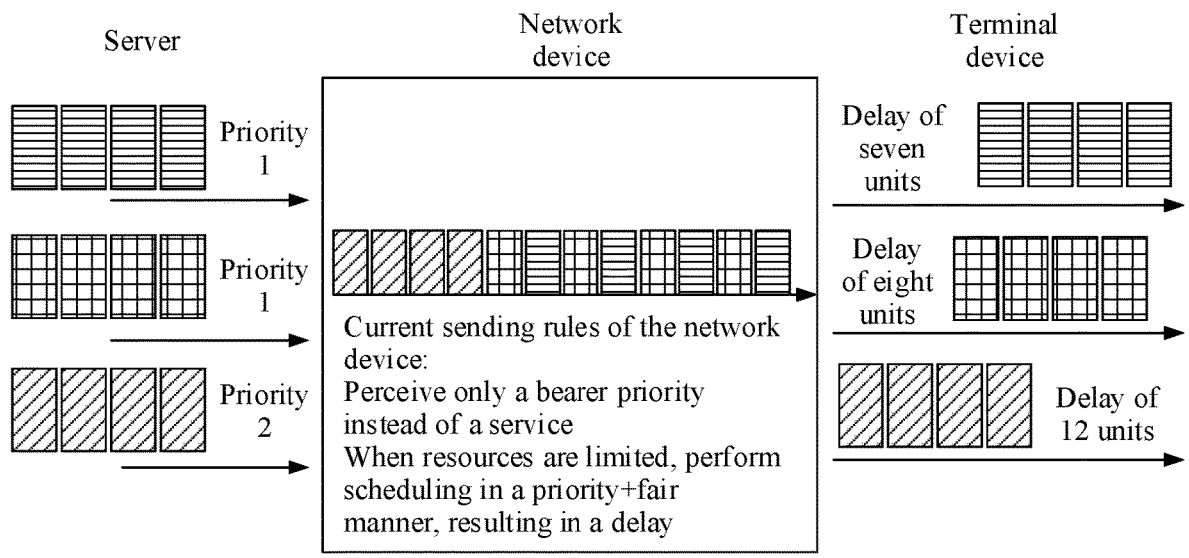
FIG. 3 is a schematic diagram of first existing video data transmission.

For example, as shown in FIG. 3, when a plurality of terminal devices simultaneously perform a cloud service, video frame data of the plurality of terminal devices may collide, in other words, video frames of the plurality of terminal devices simultaneously arrive at a base station. In this case, the following case occurs if the network device uses the "fair" scheduling rule in existing Manner 1.

It is assumed that there are three terminal devices communicating with the network device, and the terminal devices are a terminal device 1, a terminal device 2, and a terminal device 3. A bearer priority of the terminal device 1 is a priority 1, a bearer priority of the terminal device 2 is also the priority 1, and a bearer priority of the terminal device 3 is a priority 2.

Therefore, when the network device performs transmission, because the priority of the terminal device 1 and the terminal device 2 is the highest, the network device needs to preferentially transmit data packets of the terminal device 1 and the terminal device 2. After transmission of the data packets of the terminal device 1 and the terminal device 2 is completed, the network device transmits a data packet of the terminal device 3.

Because the priorities of the terminal device 1 and the terminal device 2 are the same, the network device uses the fair scheduling rule when transmitting video frames of the terminal device 1 and the terminal device 2. For example, one video frame of the terminal device 1 includes four data packets, which are data packets A1 to A4, and one video frame of the terminal device 2 also includes four data packets, which are data packets B1 to B4.

When the network device performs video data transmission, because the priorities of the terminal device 1 and the terminal device 2 are the same, the network device randomly chooses to transmit one or more data packets in a video frame corresponding to the terminal device 1 or the terminal device 2.

It is assumed that the network device first chooses to transmit the data packet A1 in the video frame corresponding to the terminal device 1, and after the network device completes transmitting the data packet A1, because the fair scheduling rule is used, during the second time of transmission, the network device chooses to transmit the data packet B1 in the video frame corresponding to the terminal device 2. Then the network device continues to transmit the data packet A2 of the terminal device 1, transmit the data packet B2 of the terminal device 2, . . . , until transmission of the video frames corresponding to the terminal device 1 and the terminal device 2 is completed. Finally, the network device transmits a data packet in a video frame corresponding to the terminal device 3.

As can be learned from the foregoing content and FIG. 3, it seems that relatively fair scheduling is performed for the three terminal devices, but time for completing transmitting a video frame of each of the three terminal devices is prolonged.

The terminal device can obtain one image through decoding only after collecting all IP packets included in one video frame. Therefore, the seemingly "fair" scheduling manner actually causes frame transmission delays of the three terminal devices to be prolonged.

In addition, for service scenarios such as a cloud gaming service and a cloud VR service, most of video data sent on a downlink is real-time video data. In these scenarios, an end-to-end delay less than 70 ms is usually required. The scheduling manner of Manner 1 cannot meet a low-delay requirement, and therefore often causes a phenomenon such as image freezing.

In conclusion, when the network device performs scheduling in Manner 1, a transmission delay is generated for each video data transmission service, and the transmission delay is uncontrollable.

Figure 4:
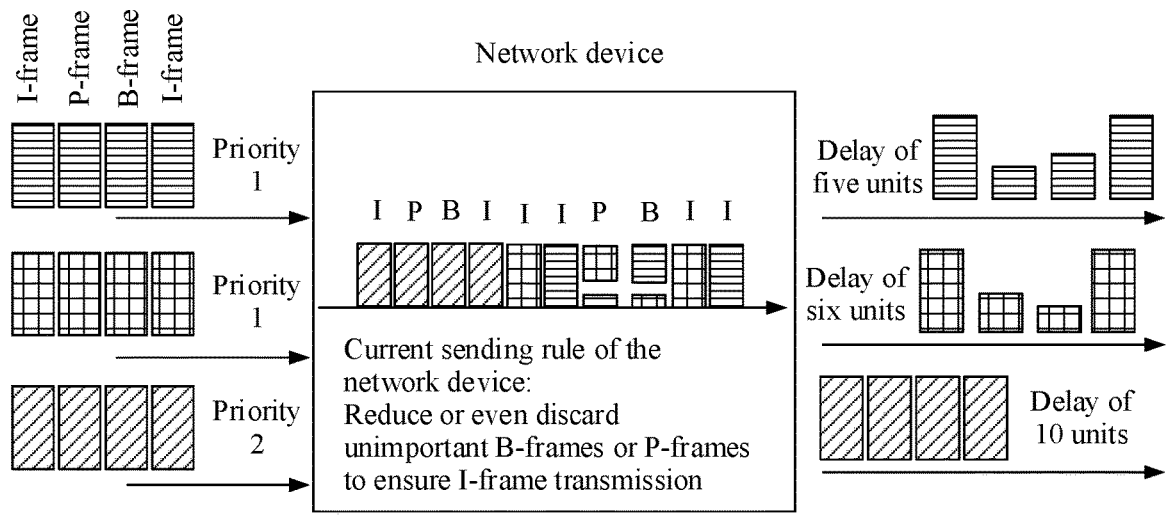
FIG. 4 is a schematic diagram of second existing video data transmission.

Manner 2: As shown in FIG. 4, in a provided video data transmission solution, when a system capacity is limited and low-delay transmission is required, content data packets may be identified to retain an important data packet and discard some unimportant data packets, so that a delay is reduced and service experience is ensured while it is ensured that service experience quality degradation is acceptable, and a quantity of users can be increased.

However, in the video data transmission solution provided in Manner 2, a deep packet inspection (DPI) needs to be performed on a service flow. In this manner, a potential security risk exists, and there are fewer scenarios in which the manner can be used. In addition, if data packet encryption is performed at a service layer, Manner 2 cannot be used.

Figure 5:
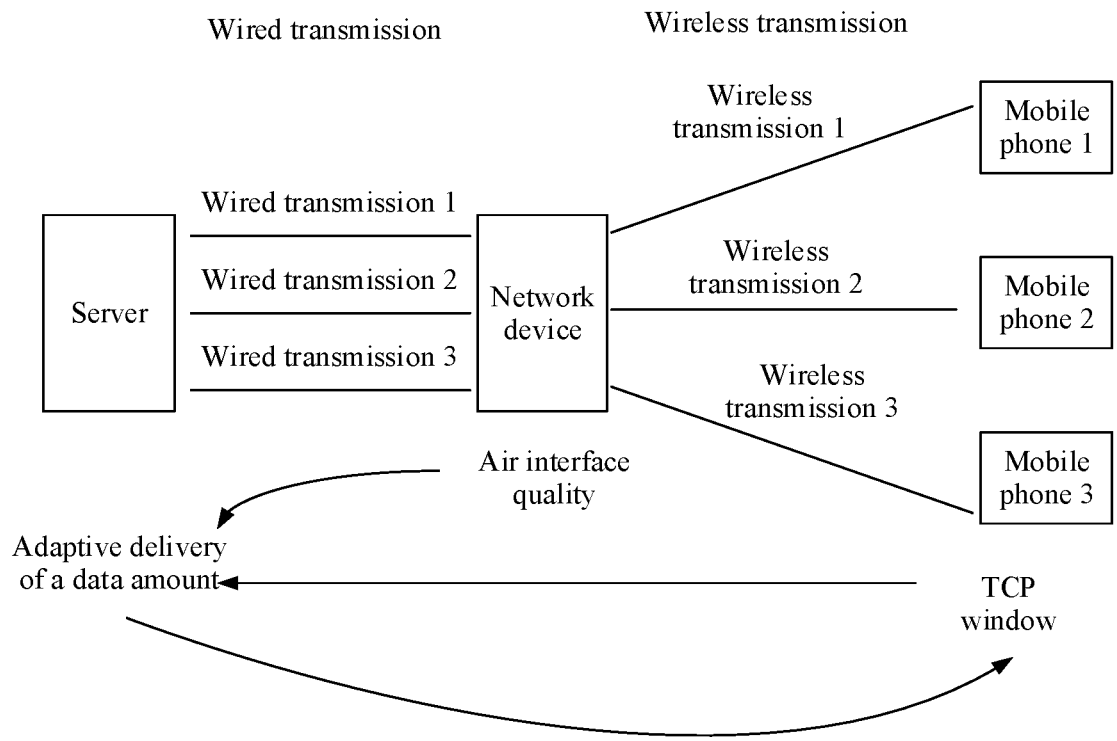
FIG. 5 is a schematic diagram of third existing video data transmission.

Manner 3: As shown in FIG. 5, in a video data transmission process, when a system capacity is limited and low-delay transmission is required, an actual sending rate is reduced from a data sending source (server) (for example, resolution decreases from 1080p to 720p) through terminal-pipe-cloud coordination, so that air interface congestion is reduced, and an air interface capacity is increased.

However, in the video data transmission solution provided in Manner 3, because end-to-end coordination is required, there is a specific implementation difficulty in an actual existing network, coordination, interconnection, and the like of a plurality of manufacturers are involved, and a periodicity is relatively long.

In conclusion, video data transmission methods in the existing solutions are relatively complex, and cannot adapt to a scenario with a relatively high transmission delay requirement.

To resolve the problem, embodiments of this application provide a video data transmission method and apparatus, to simply perform video data transmission with a low delay.

A communication system provided in this application may be, for example, a long term evolution (LTE) system supporting a 4G access technology, a new radio (NR) system supporting a 5G access technology, any cellular system related to a 3rd generation partnership project (3GPP), a wireless fidelity (WiFi) system, a worldwide interoperability for microwave access (WiMAX) system, a multi-radio access technology (RAT) system, or another future-oriented communications technology. A terminal in this application is a device with a wireless receiving/sending function, and may be deployed on land and include an indoor or outdoor device, a handheld device, or a vehicle-mounted device, or may be deployed on the water (for example, a ship), or may be deployed in the air (for example, a drone, an airplane, a balloon, or a satellite).

Figure 6:
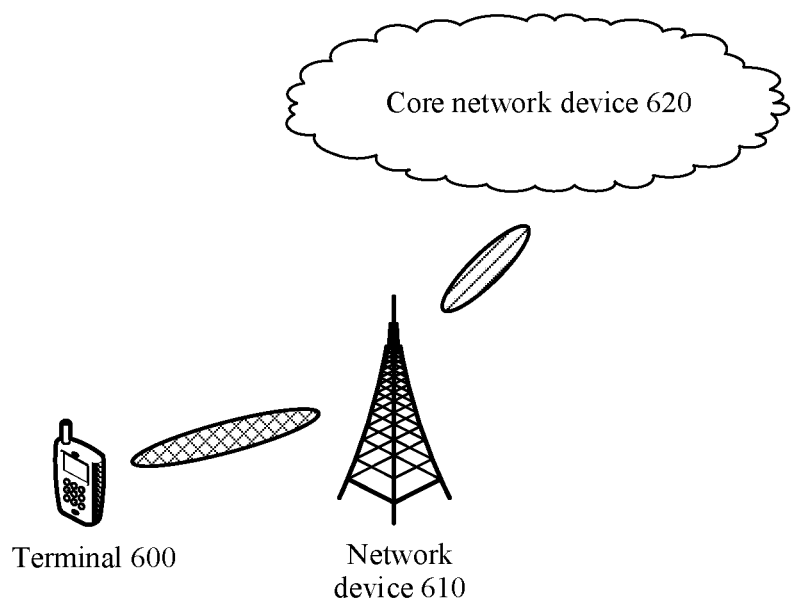
FIG. 6 is a schematic diagram of an architecture of a video data transmission system according to an embodiment of this application.

For ease of understanding embodiments of this application, a communication system shown in FIG. 6 is first used as an example to describe in detail a communication system applicable to embodiments of this application. As shown in FIG. 6, the communication system includes a terminal device 600, a network device 610, and a core network device 620.

The terminal device 600 is a device that provides voice and/or data connectivity to a user, and may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device with a wireless communications function, a computing device or another processing device connected to a wireless modem, a vehicle-mounted device or a wearable device, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

For example, the network device 610 includes an access network (AN) device. The access network device may be a radio access network (RAN) device. The access network device such as a base station (for example, an access point) may be a device that is in an access network and that communicates, over an air interface, with a wireless terminal device by using one or more cells. The base station may be configured to mutually convert a received over-the-air frame and an Internet Protocol (IP) packet and serve as a router between the terminal and a rest portion of the access network, where the rest portion of the access network may include an IP network. The network side device may further coordinate attribute management of the air interface. For example, the network side device may include an evolved NodeB (NodeB, eNB, or e-NodeB) in a long-term evolution (LTE) system or a long-term evolution-advanced (LTE-A) system, or may include a next-generation NodeB (gNB) or a next-generation evolved NodeB (ng-eNB), and an en-gNB (enhanced next generation NodeB, gNB) in a 5th generation (5G) new radio (NR) system. The enhanced next-generation NodeB may include a central unit (CU) and a distributed unit (DU) in a cloud radio access network (Cloud RAN) system, or may include a relay device. This is not limited in this embodiment of this application.

The core network device 620 includes, for example, a device that processes and forwards signaling and data of the user. In a 4G system, a core network device is, for example, a mobility management entity (MME). The MME is a key control node of an access network of the LTE system defined in a 3rd generation partnership project (3GPP) protocol, is responsible for processes such as positioning and paging of a terminal device in an idle mode, where the processes include relaying. Simply, the MME is a core network device responsible for a signaling processing part. Alternatively, in the 5G system, the core network device includes, for example, an access management network element, a session management network element, or a user plane gateway. The user plane gateway may be a server that has functions such as mobility management, routing, and forwarding for user plane data, and is usually located on a network side. For example, the user plane gateway is a serving gateway (SGW), a packet data network gateway (PGW), or a user plane function (UPF).

A 5G system (which may also be referred to as a new radio system) is used as an example. Specifically, in embodiments of this application, in a video data transmission process, a previous manner in which a "data packet" is used as a transmission unit is mainly converted to a manner in which a "video frame" is used as a transmission unit, and a transmission priority at a "video frame" level is considered to perform video data transmission, to minimize video freezing phenomena and effectively adapt to a scenario with a relatively high transmission delay requirement.

The following further describes some terms in embodiments of this application for ease of understanding.

(1) A video frame in embodiments of this application refers to each still image used to constitute a video.

In other words, one video includes a plurality of still images.

Each still image used to constitute a video is referred to as a video frame of the video.

Figure 7:
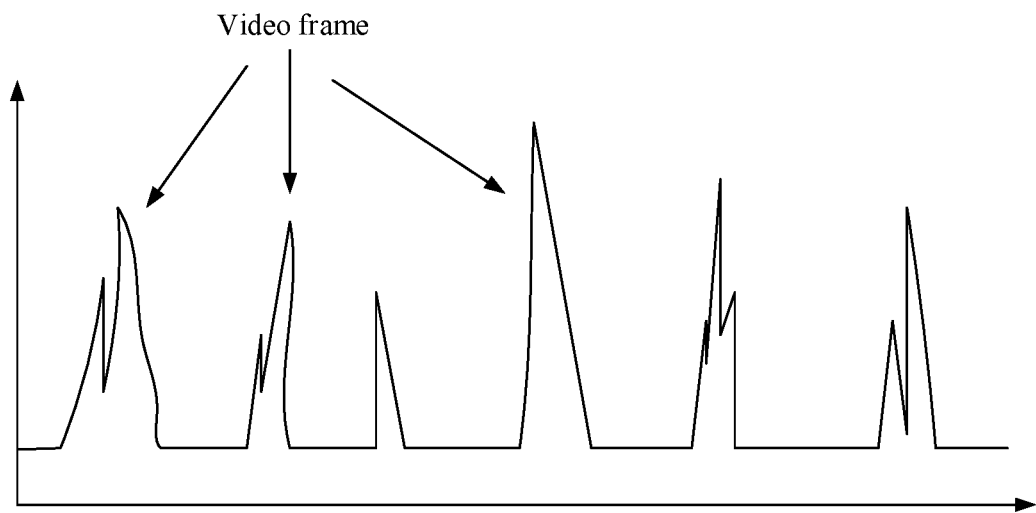
FIG. 7 is a schematic diagram of a video frame according to an embodiment of this application.

For example, FIG. 7 is a schematic diagram of a video frame from a server to a terminal according to an embodiment of this application.

Because real-time computing moves up to the cloud, a rendered image from the cloud needs to be sent to the terminal in real time for display. Currently, 30 to 60 images are usually rendered per second. An image needs to be sent immediately after the server completes rendering the image. Therefore, as shown in FIG. 7, a data traffic model that is seen from a network device side and that is sent by the server to the terminal device presents a burst state, and each peak represents one video frame. One video frame includes at least one data packet, and the data packet may be an IP packet or an ethernet packet.

(2) A transmission phase in embodiments of this application refers to a transmission batch, in one video frame, of one or more data packets in the video frame.

In an optional manner of embodiments of this application, there are three transmission phases: a frame header, a frame middle, and a frame tail.

It may be understood that the data packets in the one video frame are divided into at least three batches and sent to a corresponding terminal device.

In embodiments of this application, a transmission phase of data packets that are sent to the terminal device in the first batch of the video frame is referred to as a frame header, a transmission phase of data packets that are sent to the terminal device in a middle batch of the video frame is referred to as a frame middle, and a transmission phase of data packets that are sent to the terminal device in the last batch of the video frame is referred to as a frame tail.

It should be noted that data packets of a video frame may be consecutive, and a network device may determine, based on continuity of data packets of a video frame, whether the data packets belong to a same video frame.

In addition, embodiments of this application further provide a manner of determining a frame header, a frame middle, and a frame tail, and the manner is not specifically limited to the following manner.

Manner of Determining the Frame Header:

In embodiments of this application, if the network device does not receive, before receiving one or more data packets in a video frame of a terminal device, a data packet of the terminal device before a specific time threshold, the network device may determine a transmission phase of the one or more received data packets as a frame header.

Manner of Determining the Frame Middle:

In embodiments of this application, if the network device receives, before receiving one or more data packets in a video frame of a terminal device, a data packet of the terminal device before a specific time threshold, and also receives a data packet of the terminal device after the specific time threshold, the network device may determine, as a frame middle, a transmission phase of the one or more data packets and one or more data packets subsequently received after a specific time threshold.

Manner of Determining the Frame Tail:

In embodiments of this application, if the network device does not receive, before receiving one or more data packets in a video frame of a terminal device, a data packet of the terminal device after a specific time threshold, the network device may determine a transmission phase of the one or more data packets as a frame tail.

It should be noted that any manner of determining the frame header, the frame middle, or the frame tail is applicable to embodiments of this application and falls within the protection scope of embodiments of this application.

In the second optional manner of embodiments of this application, there are two transmission phases: a frame header and a frame tail.

It may be understood that the data packets in the one video frame are divided into a total of two batches and sent to a corresponding terminal device.

In the third optional manner of embodiments of this application, there is one transmission phase, in other words, there is only a frame header.

It may be understood that all data packets in the one video frame are sent to a corresponding terminal device at a time.

It should be noted that when only one transmission phase exists, a frame header may also be understood as a frame tail.

(3) A scheduling waiting delay in embodiments of this application refers to duration between receiving one or more data packets in a frame header in a corresponding time-frequency frame by the network device and scheduling the one or more data packets by the network device.

Figure 8:
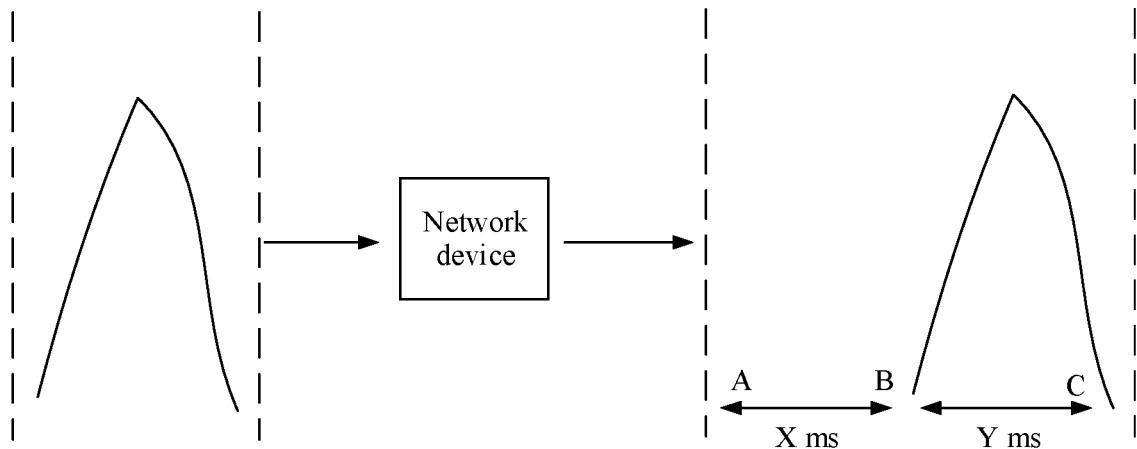
FIG. 8 is a schematic diagram of a scheduling waiting delay and a frame sending delay according to an embodiment of this application.

For example, as shown in FIG. 8, a point A indicates an initial time at which the network device receives a data packet in a video frame, namely, a time at which the network device receives a data packet whose transmission phase is a frame header in the video frame. A point B indicates a time at which the network device sends the data packet whose transmission phase is the frame header to a terminal device corresponding to the video frame. Therefore, it can be learned, based on the time corresponding to the point A and the time corresponding to the point B, that a scheduling waiting delay of the video frame is B−A=X ms (milliseconds).

Based on the foregoing content, the scheduling waiting delay in embodiments of this application may be understood as duration between receiving the data packet in the frame header in the video frame by the network device and needing to determine a priority of the data packet in the frame header in the video frame by the network device. Therefore, a sending priority of the data packet is determined based on the duration, namely, the scheduling waiting delay, and a data packet with a high priority in the video frame is further sent based on the determined priority.

It should be noted that because the scheduling waiting delay in embodiments of this application is duration between receiving one or more data packets in a frame header in a corresponding time-frequency frame by the network device and scheduling the one or more data packets by the network device, in embodiments of this application, only when a to-be-sent data packet in the video frame is in the frame header, the network device needs to consider a scheduling waiting delay of the to-be-sent data packet in the video frame.

It may be understood that when the to-be-sent data packet in the video frame is in the frame header, the network device only needs to consider the scheduling waiting delay corresponding to the video frame.

(4) A frame sending delay in embodiments of this application refers to duration between sending one or more data packets in a frame header in a video frame by the network device and scheduling one or more data packets in a frame middle or a frame tail in the video frame by the network device.

For example, as shown in FIG. 8, the point B indicates a time at which the network device sends a data packet whose transmission phase is a frame header to a terminal device corresponding to the video frame, and a point C indicates a time at which the network device sends a data packet in a frame middle or a frame tail in the video frame to the terminal device corresponding to the video frame. Therefore, it can be learned, based on the time corresponding to the point B and the time corresponding to the point C, that a frame sending delay of the video frame is C−B=Y ms.

Based on the foregoing content, the frame sending delay in embodiments of this application may be understood as duration between sending the data packet in the frame header in the video frame by the network device and needing to determine a priority of the data packet in the frame middle or the frame tail in the video frame by the network device. Therefore, a sending priority of the data packet is determined based on the duration, namely, the frame sending delay, and a data packet with a high priority in the video frame is further sent based on the determined priority.

It should be noted that because the frame sending delay in embodiments of this application is duration between sending one or more data packets in a frame header in a video frame by the network device and scheduling one or more data packets in a frame middle or a frame tail in the video frame by the network device, in embodiments of this application, only when a to-be-sent data packet in the video frame is in the frame middle or the frame tail, the network device needs to consider a frame sending delay of the to-be-sent data packet in the video frame.

It may be understood that when the to-be-sent data packet in the video frame is in the frame middle or the frame tail, the network device only needs to consider the frame sending delay corresponding to the video frame.

(5) A first duration threshold in embodiments of this application is manually set, and indicates maximum duration between receiving one or more data packets in a frame header in a corresponding video frame by the network device and scheduling the one or more data packets by the network device.

In other words, in embodiments of this application, when video data transmission is performed, it should be ensured, to the greatest extent, that a scheduling waiting delay generated when the network device transmits a video frame is less than or equal to the first duration threshold.

(6) A second duration threshold in embodiments of this application is manually set, and indicates maximum duration between sending one or more data packets in a frame header in a video frame by the network device and scheduling one or more data packets in a frame middle or a frame tail in the video frame by the network device.

In other words, in embodiments of this application, when video data transmission is performed, it should be ensured, to the greatest extent, that a frame sending delay generated when the network device transmits a video frame is less than or equal to the second duration threshold.

(7) A transmission batch in embodiments of this application refers to a quantity of times the network device schedules data packets in a video frame. Transmission batches in embodiment of this application include the first batch, a middle batch, and the last batch.

For example, a video frame A includes a total of 60 data packets, the network device transmits the first 30 data packets (namely, data packets 1 to 30) of the video frame A for the first time, and transmits all remaining data packets (namely, data packets 31 to 60) of the video frame A for the second time. Therefore, the network device completes scheduling the data packets in the video frame A by using a total of two transmission batches, namely, the first batch and the last batch.

For example, a video frame A includes a total of 60 data packets, and the network device completes transmitting all the data packets (namely, data packets 1 to 60) of the video frame A only once. Therefore, the network device completes scheduling the data packets in the video frame A by using a total of one transmission batch, namely, the first batch.

For example, a video frame A includes a total of 60 data packets, the network device transmits the first 10 data packets (namely, data packets 1 to 10) of the video frame A for the first time, the network device transmits 10 data packets (namely, data packets 11 to 20) of the video frame A for the second time, and the network device transmits 10 data packets (namely, data packets 21 to 30) of the video frame A for the third time, and transmits all remaining data packets (namely, data packets 31 to 60) of the video frame A for the fourth time. Therefore, the network device completes transmitting the data packets in the video frame A by using a total of four transmission batches, namely, the first batch, a middle batch (where the second time of transmission and the third time of transmission are collectively referred to as the middle batch), and the last batch (namely, the fourth time of transmission).

In embodiments of this application, the term "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. In addition, the terms "include" and "have" in embodiments, the claims, and the accompanying drawings of this application are not exclusive. For example, a process, a method, a system, a product, or a device that includes a series of steps or modules is not limited to the listed steps or modules, and may further include an unlisted step or module.

The following specifically describes the video data transmission method provided in embodiments of this application. Embodiments of this application are applicable to a scenario in which a network device receives, within same time, data packets of videos that correspond to a plurality of terminal devices and that are sent by a server, and the plurality of terminal devices include two terminal devices with a same device priority.

Figure 9:
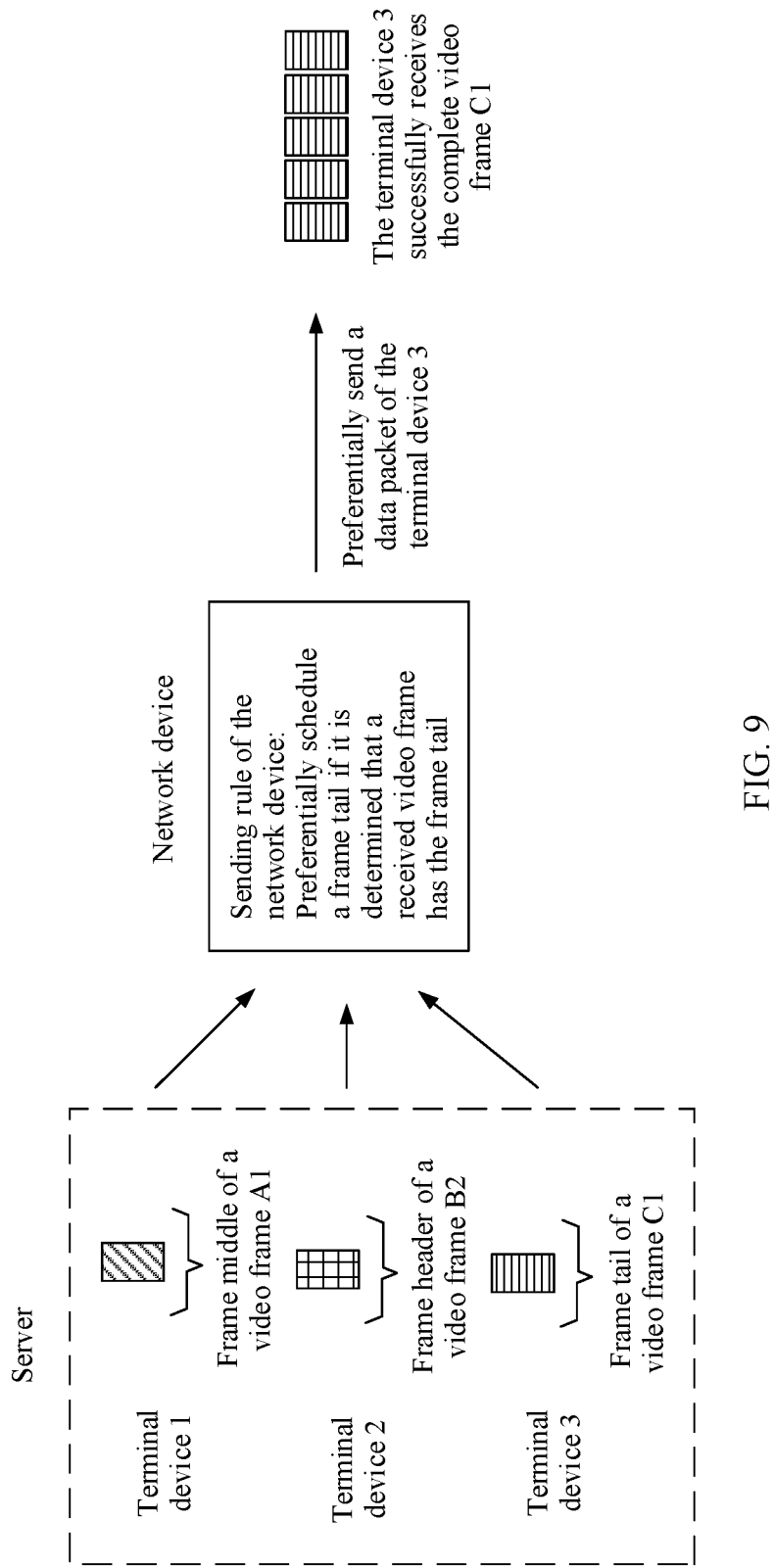
FIG. 9 is a schematic diagram of a first video data transmission scenario according to an embodiment of this application.

For example, an application scenario of embodiments of this application is shown in FIG. 9. The network device performs a video data transmission service for a terminal device 1, a terminal device 2, and a terminal device 3. The network device may receive, within same time, a video frame (for example, a video frame A1) of the terminal device 1, a video frame (for example, a video frame B2) of the terminal device 2, and a video frame (for example, a video frame C1) of the terminal device 3 that are sent by the server.

Figure 10:
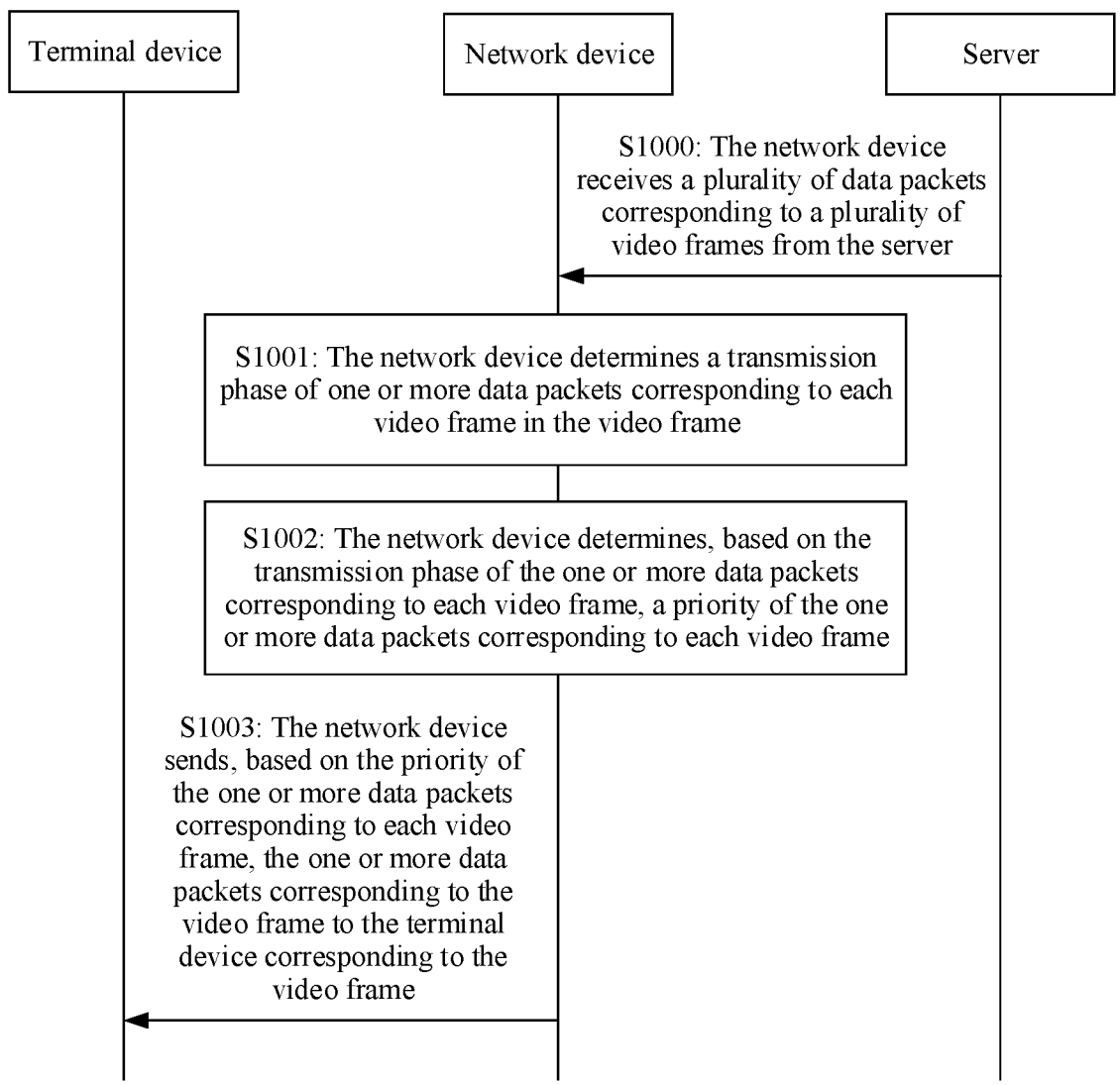
FIG. 10 is a schematic flowchart of a first video data transmission method according to an embodiment of this application.

As shown in FIG. 10, a video data transmission method provided in an embodiment of this application includes the following steps.

Step 1000: A network device receives a plurality of data packets corresponding to a plurality of video frames from a server.

Each of the plurality of video frames includes one or more data packets.

It should be noted that if the network device receives a plurality of data packets of only one video frame that are sent by the server, the network device directly schedules the data packets of the video frame.

Step 1001: The network device determines a transmission phase of the one or more data packets corresponding to each video frame in the video frame.

In this embodiment of this application, the transmission phase includes a frame header, a frame middle, or a frame tail. To be specific, content included in the transmission phase is determined based on an actual case, and may include a frame header, a frame middle, and a frame tail, or may include a frame header and a frame tail, or may include only a frame header (which may also mean that only a frame tail is included).

For brevity of description, one or more data packets corresponding to the video frame in this embodiment of this application may be understood as to-be-sent data packets, and the one or more data packets and the to-be-sent data packets may be interchangeably used in a description process.

For example, as shown in FIG. 9, the network device determines that a received video frame A1 is a video frame of a terminal device 1 and a to-be-sent data packet in the video frame A1 is currently in a frame middle of the video frame A1. The network device determines that a received video frame B2 is a video frame of a terminal device 2 and a to-be-sent data packet in the video frame B2 is currently in a frame header of the video frame B2. The network device determines that a received video frame C1 is a video frame of a terminal device 3 and a to-be-sent data packet in the video frame C1 is currently in a frame tail of the video frame C1.

Step 1002: The network device determines, based on the transmission phase of the one or more data packets corresponding to each video frame, a priority of the one or more data packets corresponding to each video frame.

Further, in this embodiment of this application, the priority of the one or more data packets corresponding to each video frame may be determined in the following manner.

Determining manner 1: The network device determines that a priority of one or more data packets in a frame tail in a corresponding video frame is greater than a priority of one or more data packets in a frame middle or a frame header in the corresponding video frame.

In other words, the frame tail has a highest priority.

If one or more data packets corresponding to a video frame are in a frame tail, the network device determines that a priority of the one or more data packets corresponding to the video frame is the highest.

For example, as shown in FIG. 9, in the video frames received by the network device, the to-be-sent data packet in the video frame C1 is in the frame tail. Therefore, a priority of the video frame C1 is the highest.

It may be understood that the video frame C1 has only the last batch of data packets to be transmitted, and after receiving the last batch of data packets of the video frame C1, the terminal device can obtain complete data packets of the video frame C1, to parse the video frame C1 to obtain an image of the video frame C1.

Therefore, to ensure that the terminal device can quickly receive the complete video frame C1, the network device preferentially sends one or more data packets corresponding to the video frame C1 to the terminal device, so that transmission of the entire video frame C1 can be quickly completed, and the terminal device (namely, the terminal device 3) corresponding to the video frame C1 can receive the complete video frame as soon as possible to perform video play.

Therefore, when determining that the to-be-sent data packet in the video frame C1 is in the frame tail, the network device raises a transmission priority of the video frame C1 to the highest, in other words, preferentially sends the one or more data packets corresponding to the video frame C1.

Determining condition 2: The network device determines that a priority of one or more data packets in a frame middle in a corresponding video frame is greater than a priority of one or more data packets in a frame header in the corresponding video frame.

In other words, if video frames received by the network device include a video frame with one or more corresponding data packets in a frame middle and a video frame with one or more corresponding data packets in a frame header, the network device preferentially sends the one or more data packets in the frame middle that correspond to the video frame.

Figure 11:
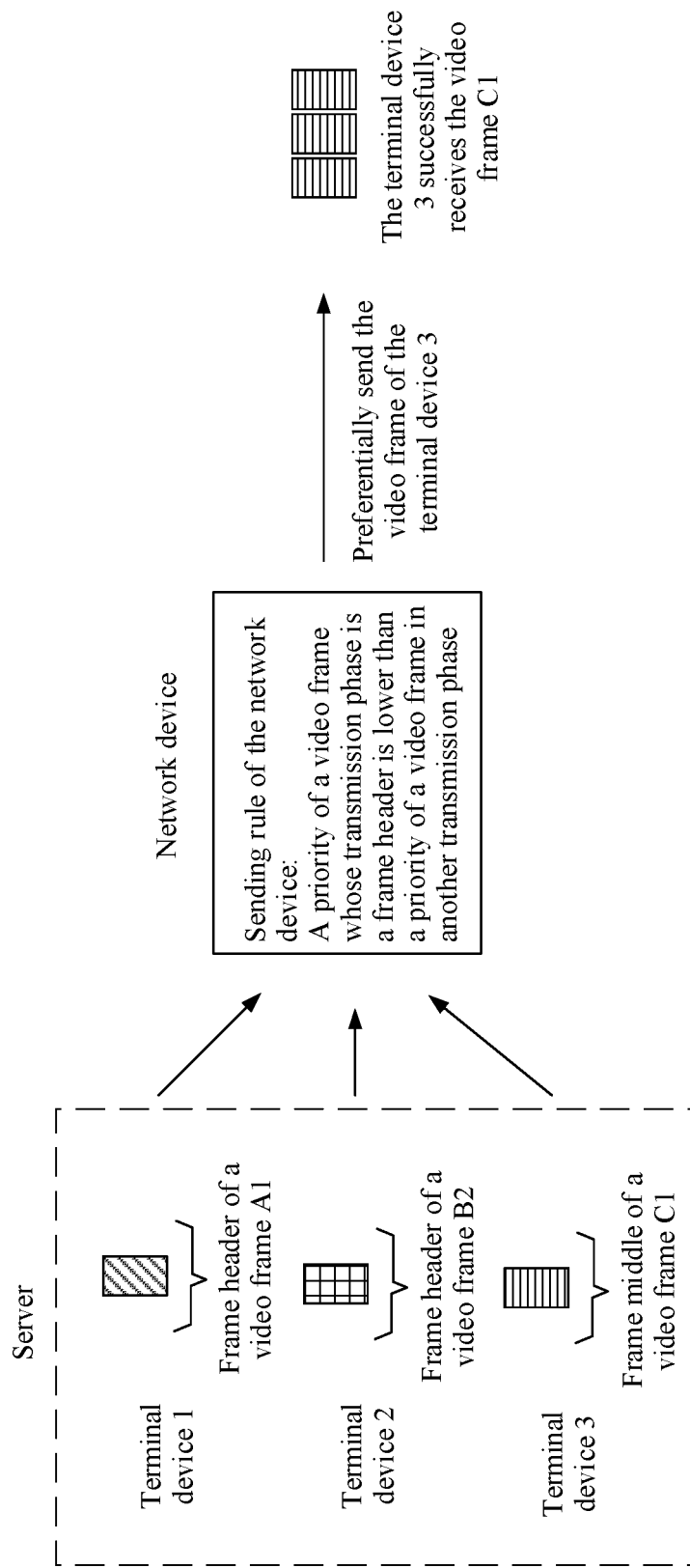
FIG. 11 is a schematic diagram of a second video data transmission scenario according to an embodiment of this application.

For example, as shown in FIG. 11, in video frames received by the network device, a video frame A1 is a video frame of the terminal device 1 and a to-be-sent data packet in the video frame A1 is in a frame header. The network device determines that a received video frame B2 is a video frame of the terminal device 2 and a to-be-sent data packet in the video frame B2 is in a frame header. The network device determines that a received video frame C1 is a video frame of the terminal device 3 and a to-be-sent data packet in the video frame C1 is in a frame middle.

Therefore, it can be learned from the determining condition 2 that a priority of the video frame C1 is the highest.

Compared with the video frame A1 and the video frame B2, some data packets of the video frame C1 have been sent to the terminal device corresponding to the video frame C1. After receiving the some data packets of the video frame C1, the terminal device expects to obtain complete data packets of the video frame C1 as soon as possible, to parse the video frame C1 to obtain an image of the video frame C1.

Therefore, to ensure that the terminal device can quickly receive the complete video frame C1, in the scenario in FIG. 11, the network device preferentially sends one or more data packets in the frame middle that correspond to the video frame C1 to the terminal device, so that transmission of the entire video frame C1 can be quickly completed, and the terminal device (namely, the terminal device 3) corresponding to the video frame C1 can receive the complete video frame C1 as soon as possible to perform video play.

In addition, in this manner, when the network device sends the data packet of the video frame C1 to the terminal device, the network device further continues to receive data packets of the video frame A1 and the video frame B2 from the server, so that to-be-sent data packets of the video frame A1 and the video frame B2 are further increased, or even complete data packets of the video frame A1 and the video frame B2 may be received.

Therefore, when sending the video frame A1 and the video frame B2, more data packets can be sent at a time, or even complete data packets can be sent at a time, so that a corresponding terminal device can more quickly obtain complete data packets of the video frame to perform parsing and video play.

Further, if transmission phases of one or more data packets separately corresponding to a plurality of video frames (for example, the video frame A1 and the video frame B2 in FIG. 11) received by the network device are the same, the network device may further determine, based on scheduling waiting delays and/or frame sending delays of the one or more data packets respectively corresponding to the plurality of video frames, a priority of one or more data packets corresponding to each video frame.

Specifically, in this embodiment of this application, if the transmission phases of the one or more data packets separately corresponding to the plurality of video frames are the same, a priority of the video frame may be determined, by using a plurality of conditions, based on a scheduling waiting delay and/or a frame sending delay corresponding to the video frame. The following separately describes the conditions.

Determining condition 3: A priority of one or more data packets corresponding to a video frame with a large scheduling waiting delay is greater than a priority of one or more data packets corresponding to a video frame with a small scheduling waiting delay.

To be specific, if a transmission phase of one or more data packets corresponding to each of a plurality of video frames is a frame header, the network device determines a scheduling waiting delay of the one or more data packets corresponding to each of the plurality of video frames. A priority of one or more data packets corresponding to a video frame with a largest scheduling waiting delay is preferentially sent.

Figure 12:
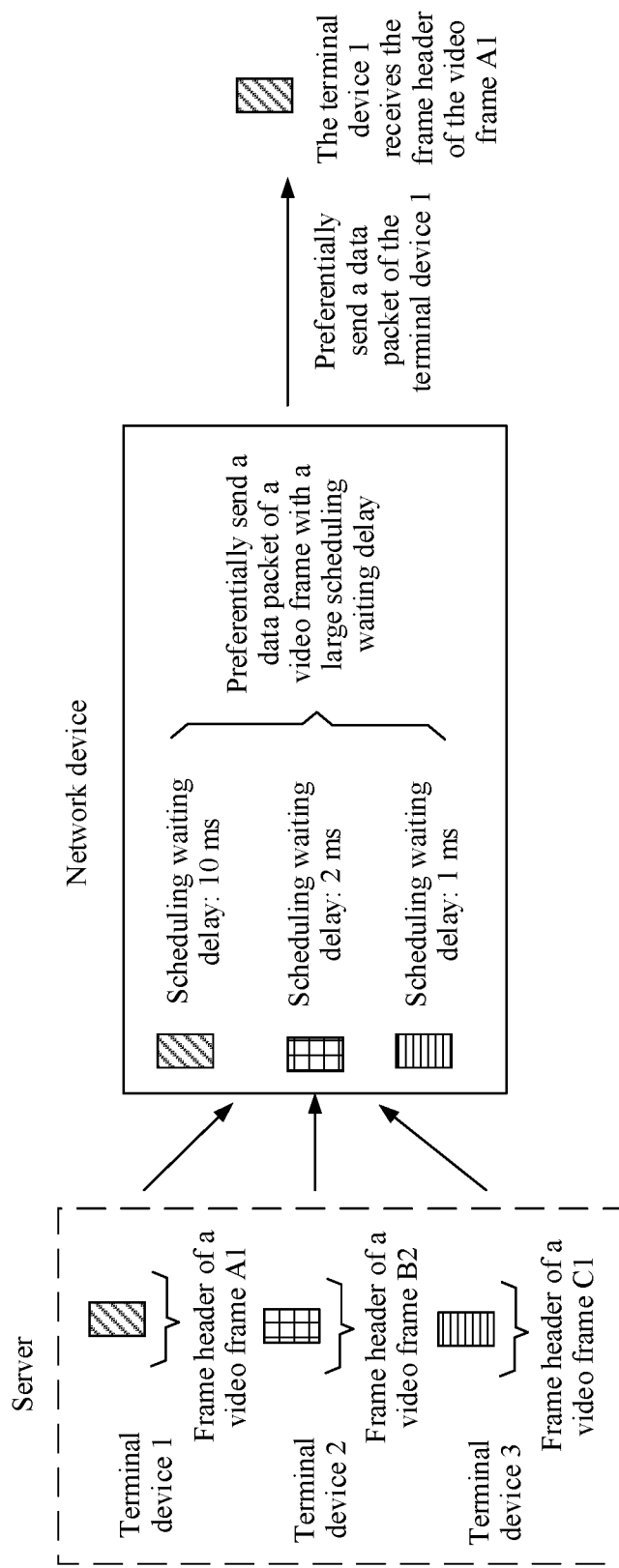
FIG. 12 is a schematic diagram of a third video data transmission scenario according to an embodiment of this application.

For example, as shown in FIG. 12, in video frames received by the network device, a video frame A1 is a video frame of the terminal device 1, a to-be-sent data packet in the video frame A1 is in a frame header, and a scheduling waiting delay corresponding to the to-be-sent data in the video frame A1 is 10 ms. The network device determines that a received video frame B2 is a video frame of the terminal device 2, a to-be-sent data packet in the video frame B2 is in a frame header, and a scheduling waiting delay corresponding to the to-be-sent data in the video frame B2 is 2 ms. The network device determines that a received video frame C1 is a video frame of the terminal device 3, a to-be-sent data packet in the video frame C1 is in a frame header, and a scheduling waiting delay corresponding to the to-be-sent data in the video frame C1 is 1 ms.

It can be learned that a scheduling waiting delay of one or more data packets corresponding to the video frame A1 is the largest, a scheduling waiting delay of one or more data packets corresponding to the video frame B2 is the second largest, and a scheduling waiting delay of one or more data packets corresponding to the video frame C1 is the smallest. Therefore, a priority of the one or more data packets corresponding to the video frame A1 is greater than a priority of the one or more data packets corresponding to the video frame B2, and the priority of the one or more data packets corresponding to the video frame B2 is greater than a priority of the one or more data packets corresponding to the video frame C1.

In other words, the one or more data packets corresponding to the video frame A1 are preferentially sent.

Determining condition 4: A priority of one or more data packets corresponding to a video frame with a large frame sending delay is greater than a priority of one or more data packets corresponding to a video frame with a small frame sending delay.

To be specific, if a transmission phase of one or more data packets corresponding to each of a plurality of video frames is a frame middle or a frame tail, the network device determines a frame sending delay of the one or more data packets corresponding to each of the plurality of video frames. A priority of one or more data packets corresponding to a video frame with a largest frame sending delay is preferentially sent.

Figure 13:
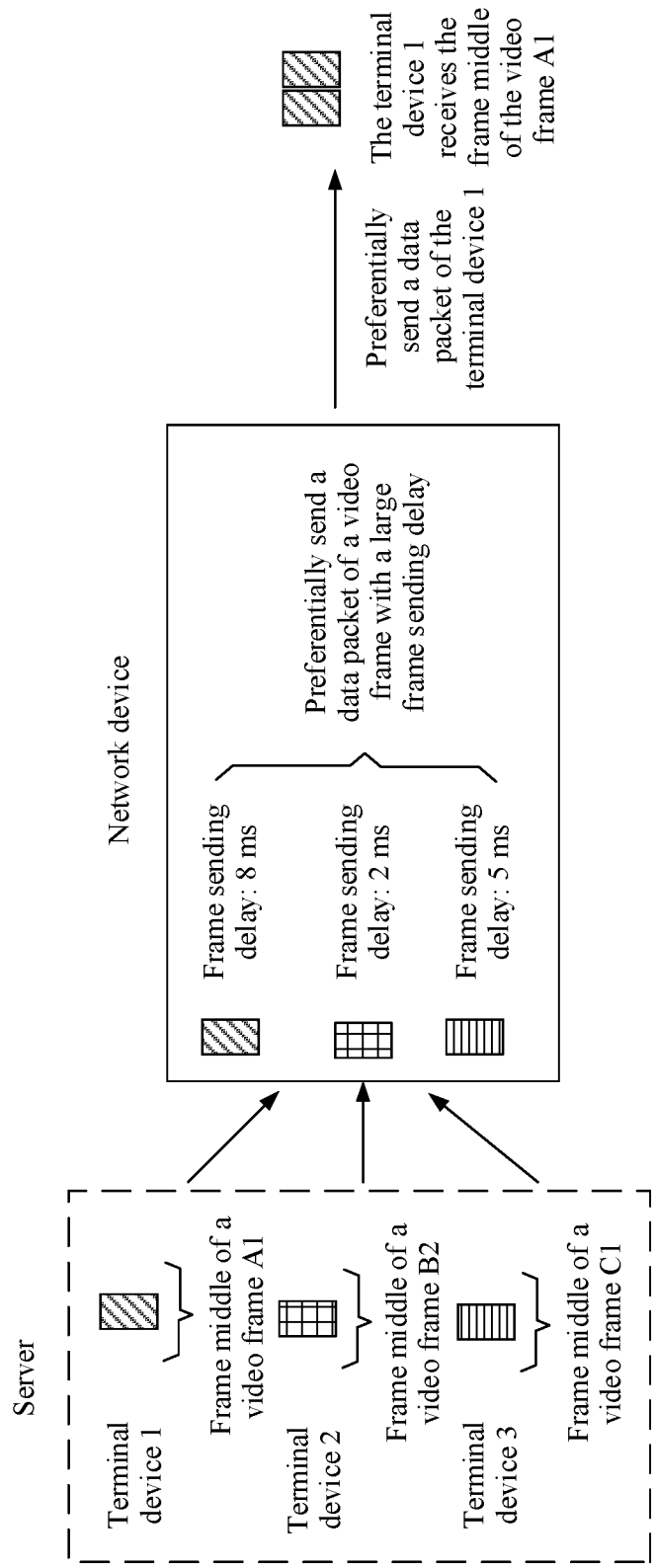
FIG. 13 is a schematic diagram of a fourth video data transmission scenario according to an embodiment of this application.

For example, as shown in FIG. 13, in video frames received by the network device, a video frame A1 is a video frame of the terminal device 1, a to-be-sent data packet in the video frame A1 is in a frame middle, and a frame sending delay corresponding to the to-be-sent data in the video frame A1 is 8 ms. The network device determines that a received video frame B2 is a video frame of the terminal device 2, a to-be-sent data packet in the video frame B2 is in a frame middle, and a frame sending delay corresponding to the to-be-sent data in the video frame B2 is 2 ms. The network device determines that a received video frame C1 is a video frame of the terminal device 3, a to-be-sent data packet in the video frame C1 is in a frame middle, and a frame sending delay corresponding to the to-be-sent data in the video frame C1 is 5 ms.

It can be learned that a frame sending delay of one or more data packets corresponding to the video frame A1 is the largest, a frame sending delay of one or more data packets corresponding to the video frame C1 is the second largest, and a frame sending delay of one or more data packets corresponding to the video frame B2 is the smallest. Therefore, a priority of the one or more data packets corresponding to the video frame A1 is greater than a priority of the one or more data packets corresponding to the video frame C1, and the priority of the one or more data packets corresponding to the video frame C1 is greater than a priority of the one or more data packets corresponding to the video frame B2.

In other words, the one or more data packets corresponding to the video frame A1 are preferentially sent.

In conclusion, in this embodiment of this application, when video data is transmitted, a priority of one or more data packets in a frame tail in a corresponding video frame is the highest, a priority of one or more data packets in a frame tail in a corresponding video frame is the second highest, and a priority of one or more data packets in a frame tail in a corresponding video frame is the lowest.

In addition, if transmission phases of one or more data packets separately corresponding to a plurality of video frames are the same when the network device determines a priority of one or more data packets corresponding to the video frame, the network device may further determine, based on a scheduling waiting delay or a frame sending delay corresponding to the video frame, sending priorities of the one or more data packets in the same transmission phase that correspond to the video frames.

Step 1003: The network device sends, based on the priority of the one or more data packets corresponding to each video frame, the one or more data packets corresponding to the video frame to a terminal device corresponding to the video frame.

Figure 14:
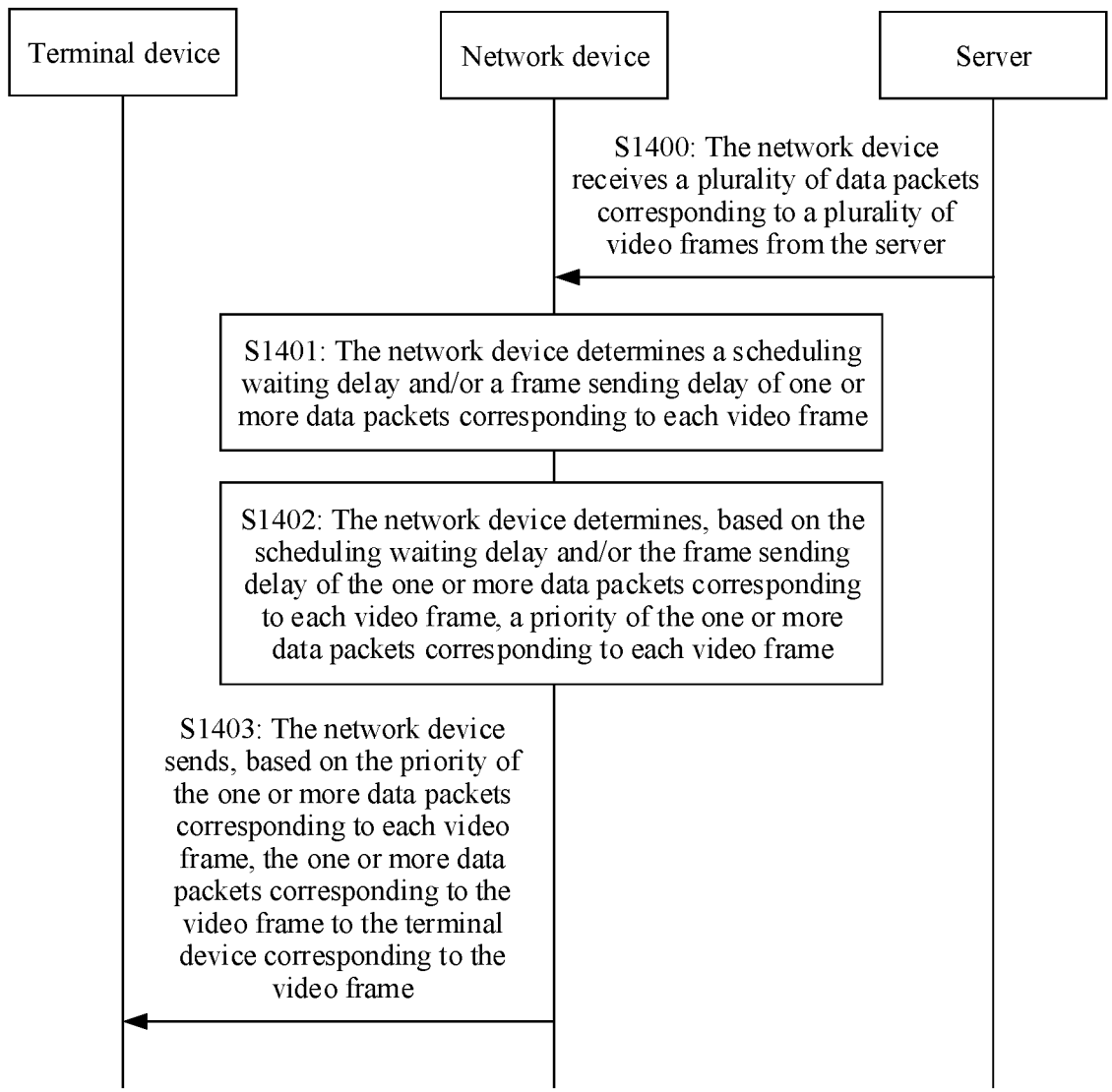
FIG. 14 is a schematic flowchart of a second video data transmission method according to an embodiment of this application.

In addition, an embodiment of this application further provides another video data transmission method. As shown in FIG. 14, the video data transmission method provided in this embodiment of this application includes the following steps.

Step 1400: A network device receives a plurality of data packets corresponding to a plurality of video frames from a server.

Each of the plurality of video frames includes one or more data packets.

Step 1401: The network device determines a scheduling waiting delay and/or a frame sending delay of the one or more data packets corresponding to each video frame.

In this embodiment of this application, a scheduling waiting delay of one or more data packets corresponding to a video frame may be determined in the following manner.

Specifically, the network device determines a transmission phase of the one or more data packets corresponding to the video frame, and if the transmission phase of the one or more data packets corresponding to the video frame is a frame header, the one or more data packets corresponding to the video frame have a scheduling waiting delay. Then the network device determines, as the scheduling waiting delay of the one or more data packets corresponding to the video frame, duration between receiving the data packets in the frame header in the video frame and needing to determine a priority of the data packets in the frame header in the video frame.

In other words, the scheduling waiting delay needs to be determined only for the one or more data packets in the frame header that correspond to the video frame.

In an optional manner of this embodiment of this application, the network device may determine, by using a timer, a scheduling waiting delay and/or a frame sending delay corresponding to each video frame.

For example, after receiving a data packet in a frame header in a video frame A1, the network device enables a timer 1 corresponding to the video frame A1, and determines time of the timer 1 as a scheduling waiting delay of the video frame A1. When the network device needs to determine a priority of the data packet in the frame header in the video frame A1, the network device disables the timer 1 corresponding to the video frame A1. In this case, duration measured by the timer 1 is a scheduling waiting delay of the one or more data packets corresponding to the video frame A1.

In this embodiment of this application, a frame sending delay of one or more data packets corresponding to a video frame may be determined in the following manner.

Specifically, the network device determines a transmission phase of the one or more data packets corresponding to the video frame, and if the transmission phase of the one or more data packets corresponding to the video frame is a frame middle or a frame tail, the one or more data packets corresponding to the video frame have a frame sending delay. Then the network device determines, as the frame sending delay of the one or more data packets corresponding to the video frame, duration between sending a data packet in the frame header in the video frame and needing to determine a priority of the data packets in the frame middle or the frame tail in the video frame.

In other words, the frame sending delay needs to be determined only for the one or more data packets in the frame middle or the frame tail that correspond to the video frame.

For example, after sending the data packet in the frame header in the video frame A1, the network device enables a timer 2 corresponding to the video frame A1, and determines time of the timer 2 as a frame sending delay of the video frame A1. When the network device needs to determine a priority of a data packet in a frame middle or a frame tail in the video frame A1, the network device disables the timer 2 corresponding to the video frame A1. In this case, duration measured by the timer 2 is a frame sending delay of the one or more data packets corresponding to the video frame A1.

For example, after sending the data packet in the frame header in the video frame A1, the network device enables the timer 1 corresponding to the video frame A1 again, and in this case, determines time of the timer 1 as a frame sending delay of the video frame A1. When the network device needs to determine a priority of a data packet in a frame middle or a frame tail in the video frame A1, the network device disables the timer 1 corresponding to the video frame A1. In this case, duration measured by the timer 1 is a frame sending delay of the one or more data packets corresponding to the video frame A1.

It should be noted that in this embodiment of this application, content included in the transmission phase is determined based on an actual case, and may include a frame header, a frame middle, and a frame tail, or may include a frame header and a frame tail, or may include only a frame header (which may also mean that only a frame tail is included).

For brevity of description, one or more data packets corresponding to the video frame in this embodiment of this application may be understood as to-be-sent data packets, and the one or more data packets and the to-be-sent data packets may be interchangeably used in a description process.

Step 1402: The network device determines, based on the scheduling waiting delay and/or the frame sending delay of the one or more data packets corresponding to each video frame, a priority of the one or more data packets corresponding to each video frame.

Further, in this embodiment of this application, the priority of the one or more data packets corresponding to each video frame may be determined in the following manner.

Determining condition 1: A priority of one or more data packets corresponding to a video frame with a large scheduling waiting delay is greater than a priority of one or more data packets corresponding to a video frame with a small scheduling waiting delay.

It can be learned from the foregoing content that only one or more data packets in a frame header that correspond to the video frame have a scheduling waiting delay, and in this case, when the network device compares one or more data packets that are in frame headers and that correspond to a plurality of video frames, the network device determines a scheduling waiting delay of one or more data packets corresponding to each of the plurality of video frames. A priority of one or more data packets corresponding to a video frame with a largest scheduling waiting delay is preferentially sent.

For example, as shown in FIG. 12, a scheduling waiting delay corresponding to to-be-sent data in a video frame A1 is the largest, a scheduling waiting delay of one or more data packets corresponding to a video frame B2 is the second largest, and a scheduling waiting delay of one or more data packets corresponding to a video frame C1 is the smallest. Therefore, a priority of the one or more data packets corresponding to the video frame A1 is greater than a priority of the one or more data packets corresponding to the video frame B2, and the priority of the one or more data packets corresponding to the video frame B2 is greater than a priority of the one or more data packets corresponding to the video frame C1.

In other words, the one or more data packets corresponding to the video frame A1 are preferentially sent.

Determining condition 2: A priority of one or more data packets corresponding to a video frame with a large frame sending delay is greater than a priority of one or more data packets corresponding to a video frame with a small frame sending delay.

It can be learned from the foregoing content that only one or more data packets in a frame middle or a frame tail that correspond to the video frame have a frame sending delay, and in this case, when the network device compares one or more data packets that are in frame middles and/or frame tails and that correspond to a plurality of video frames, the network device determines a frame sending delay of one or more data packets corresponding to each of the plurality of video frames. A priority of one or more data packets corresponding to a video frame with a largest frame sending delay is preferentially sent.

For example, it can be learned from FIG. 13 that a frame sending delay of one or more data packets corresponding to a video frame A1 is the largest, a frame sending delay of one or more data packets corresponding to a video frame C1 is the second largest, and a frame sending delay of one or more data packets corresponding to a video frame B2 is the smallest. Therefore, a priority of the one or more data packets corresponding to the video frame A1 is greater than a priority of the one or more data packets corresponding to the video frame C1, and the priority of the one or more data packets corresponding to the video frame C1 is greater than a priority of the one or more data packets corresponding to the video frame B2.

In other words, the one or more data packets corresponding to the video frame A1 are preferentially sent.

Further, if frame sending delays of one or more data packets separately corresponding to a plurality of video frames received by the network device are the same, the network device may further determine, based on a transmission phase of one or more data packets corresponding to each of the plurality of video frames, a priority of the one or more data packets corresponding to each video frame.

Specifically, in this embodiment of this application, if transmission phases of the one or more data packets separately corresponding to the plurality of video frames are the same, when a priority of the video frame is determined based on a frame sending delay corresponding to the video frame, a priority of the data packet may be determined in the following manner.

Determining manner 3: A priority of one or more data packets in a frame tail in a corresponding video frame is greater than a priority of one or more data packets in a frame middle in the corresponding video frame.

In other words, the frame tail has a highest priority.

If a frame sending delay of one or more data packets corresponding to each of a plurality of video frames is the same, the network device determines a transmission phase of the one or more data packets corresponding to each of the plurality of video frames, and then preferentially sends one or more data packets in a frame tail in a corresponding video frame.

Figure 15:
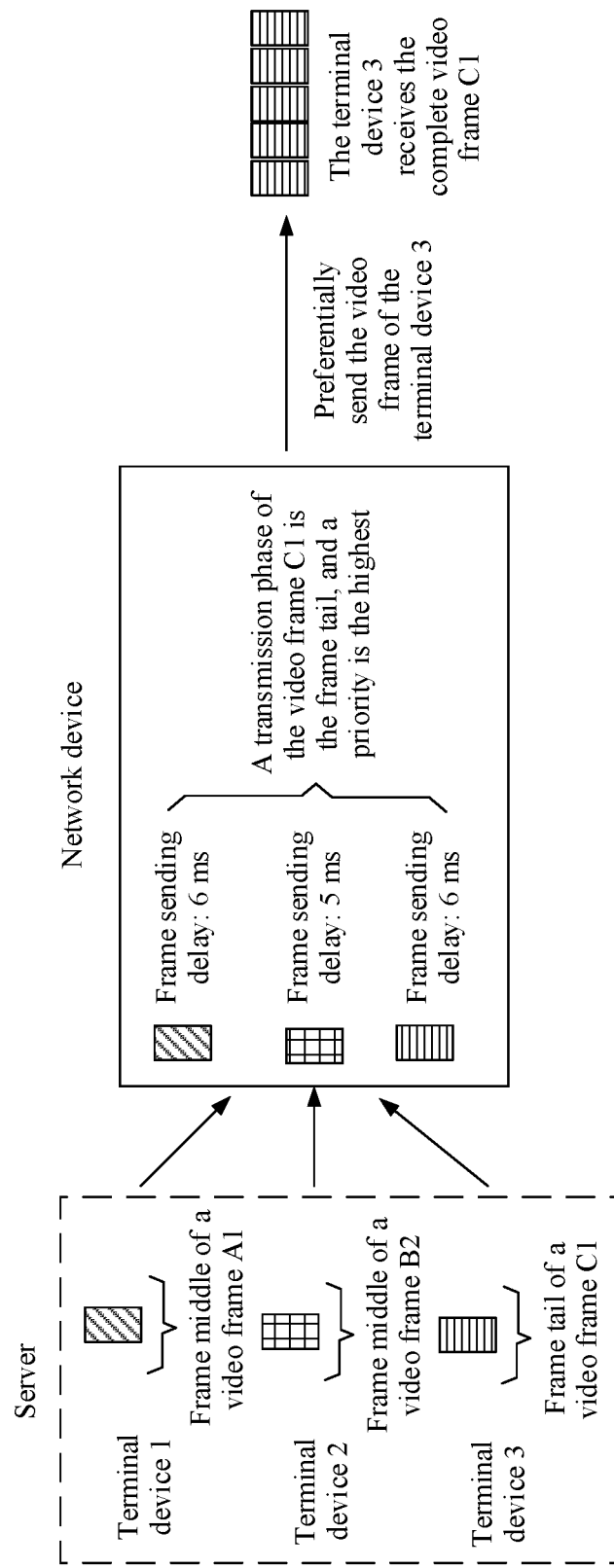
FIG. 15 is a schematic diagram of a fifth video data transmission scenario according to an embodiment of this application.

For example, as shown in FIG. 15, the network device determines that a received video frame A1 is a video frame of a terminal device 1, a to-be-sent data packet in the video frame A1 is in a frame middle, and a corresponding frame sending delay is 6 ms. The network device determines that a received video frame B2 is a video frame of a terminal device 2, a to-be-sent data packet in the video frame B2 is in a frame middle, and a corresponding frame sending delay is 5 ms. The network device determines that a received video frame C1 is a video frame of a terminal device 3, a to-be-sent data packet in the video frame C1 is in a frame tail, and a corresponding frame sending delay is 6 ms.

It can be learned by analyzing the scenario in FIG. 15 that the frame sending delays of the video frame A1 and the video frame C1 are greater than the frame sending delay of the video frame B2. Therefore, priorities of the video frame A1 and the video frame C1 are greater than a priority of the video frame B2.

However, when the priorities of the video frame A1 and the video frame C1 are compared, because the frame sending delays corresponding to the video frame A1 and the video frame C1 are the same, transmission phases of the video frame A1 and the video frame C1 are further compared.

Because the to-be-sent data packet in the video frame C1 is in the frame tail, and the to-be-sent data packet in the video frame A1 is in the frame middle, it can be learned, based on the determining manner 3 in this scenario, that a priority of one or more data packets in a frame tail that correspond to a video frame is greater than a priority of one or more data packets in a frame middle that correspond to a video frame. Therefore, the network device first sends one or more data packets corresponding to the video frame C1.

In addition, in this embodiment of this application, priorities of one or more data packets corresponding to a video frame with a scheduling waiting delay and one or more data packets corresponding to a video frame with a frame sending delay may be further determined in the following plurality of manners.

Determining manner 5: A priority of one or more data packets corresponding to a video frame with a frame sending delay is greater than a priority of one or more data packets corresponding to a video frame with a scheduling waiting delay.

Determining manner 6: A priority of one or more data packets corresponding to a video frame whose scheduling waiting delay reaches a first duration threshold is greater than a priority of one or more data packets corresponding to a video frame whose frame sending delay does not reach a second duration threshold.

The first duration threshold is maximum duration between receiving one or more data packets in a frame header in a corresponding video frame by the network device and scheduling the one or more data packets by the network device, and the second duration threshold is maximum duration between sending one or more data packets in a frame header in a video frame by the network device and scheduling one or more data packets in a frame middle or a frame tail in the video frame by the network device.

Based on the content of the determining manner 6, there may be specifically three cases.

(1) Case 1: A priority of one or more data packets corresponding to a video frame with a scheduling waiting delay that does not reach the first threshold is less than a priority of one or more data packets corresponding to a video frame with a frame sending delay.

(2) Case 2: A priority of one or more data packets corresponding to a video frame with a scheduling waiting delay that reaches the first duration threshold is greater than a priority of one or more data packets corresponding to a video frame with a frame sending delay that does not reach the second duration threshold.

(3) Case 3: A priority of one or more data packets corresponding to a video frame with a frame sending delay that reaches the second duration threshold is the highest.

Figure 16:
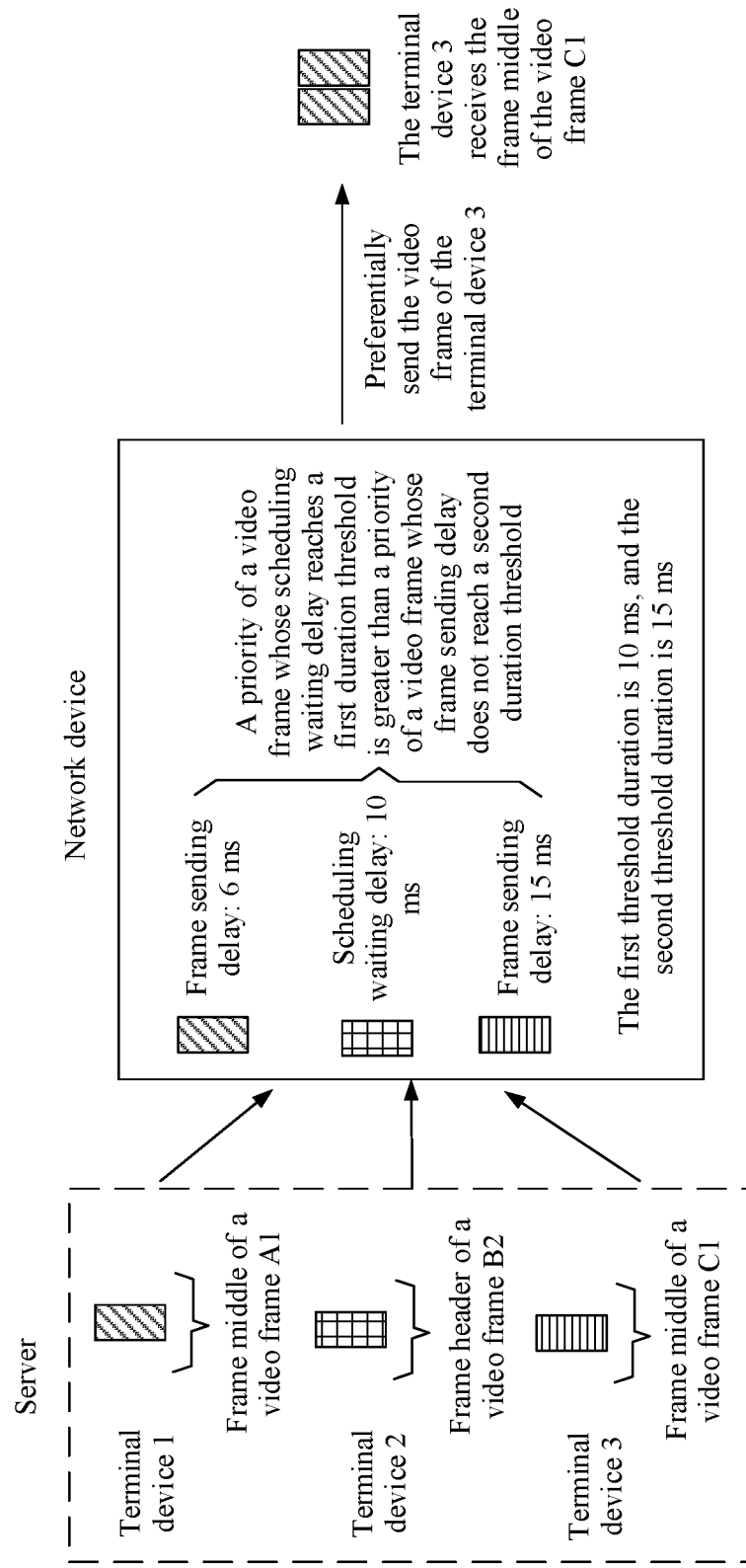
FIG. 16 is a schematic diagram of a sixth video data transmission scenario according to an embodiment of this application.

For example, the first duration threshold is 10 ms, and the second duration threshold is 15 ms. As shown in FIG. 16, the network device determines that a received video frame A1 is a video frame of the terminal device 1, a to-be-sent data packet in the video frame A1 is in a frame middle, and a corresponding frame sending delay is 6 ms. The network device determines that a received video frame B2 is a video frame of the terminal device 2, a to-be-sent data packet in the video frame B2 is in a frame header, and a corresponding scheduling waiting delay is 10 ms. The network device determines that a received video frame C1 is a video frame of the terminal device 3, a to-be-sent data packet in the video frame C1 is in a frame middle, and a corresponding frame sending delay is 15 ms.

It can be learned, by analyzing the scenario in FIG. 16, that the to-be-sent data packet in the video frame C1 has a highest priority, the to-be-sent data packet in the video frame A1 has a second highest priority, and the to-be-sent data packet in the video frame B2 has a lowest priority.

In an optional manner of this embodiment of this application, a value of the first duration threshold in this embodiment of this application is related to a service of the network device. The network device may learn of the value of the first duration threshold in advance, and preconfigure the value of the first duration threshold on a parameter configuration interface. The value of the first duration threshold in this embodiment of this application is related to the service of the network device. The network device may learn of the value of the first duration threshold in advance, and preconfigure the value of the first duration threshold on the parameter configuration interface.

In conclusion, in this embodiment of this application, when video data is transmitted in this scenario, a priority of one or more data packets corresponding to a video frame with a large scheduling waiting delay is greater than a priority of one or more data packets corresponding to a video frame with a small scheduling waiting delay, and a priority of one or more data packets corresponding to a video frame with a large frame sending delay is greater than a priority of one or more data packets corresponding to a video frame with a small frame sending delay.

In addition, if a frame sending delay of one or more data packets corresponding to each of a plurality of video frames is the same, the network device determines a transmission phase of the one or more data packets corresponding to each of the plurality of video frames. A priority of one or more data packets in a frame tail in a corresponding video frame is greater than a priority of one or more data packets in a frame middle in the corresponding video frame.

Step 1403: The network device sends, based on the priority of the one or more data packets corresponding to each video frame, the one or more data packets corresponding to the video frame to a terminal device corresponding to the video frame.

Further, in an existing video data transmission scenario, a network device often needs to hand over a corresponding terminal device to another network device.

For example, when the terminal device moves between cells, cell handover is often performed when a wireless signal meets a specific condition. If a signal of a source cell in which the terminal device is currently located is less than a threshold, and a signal of another cell (namely, a target cell) is greater than a threshold, the network device sends handover instructions to the terminal device, so that the terminal device is disconnected from the source cell and performs a signal connection to the target cell.

Figure 17:
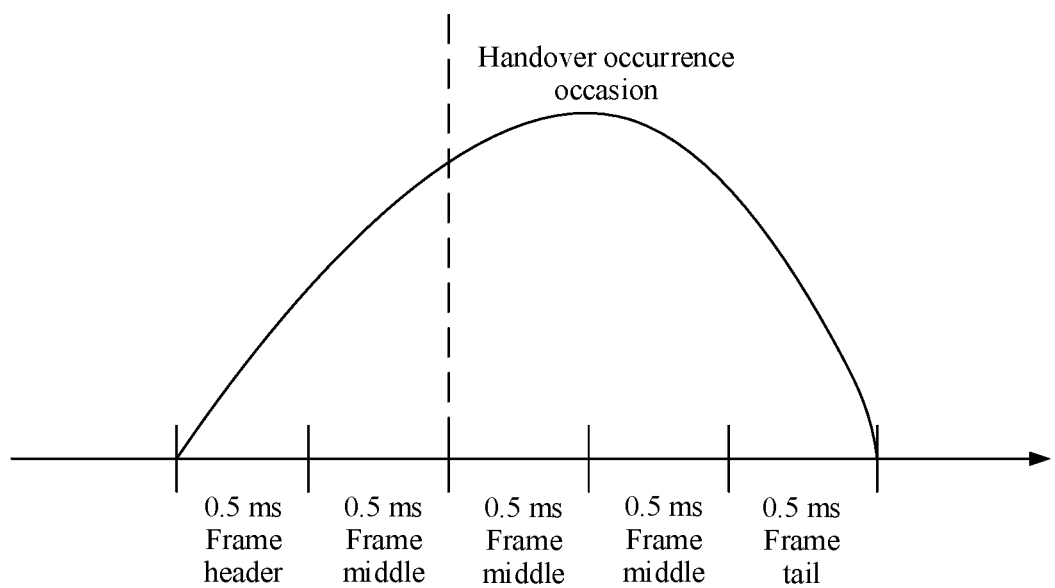
FIG. 17 is a schematic diagram in which a video frame being transmitted exists during handover.

However, transmission of one or more data packets in a frame tail in a video frame corresponding to the terminal device may not be completed in a handover process of the terminal device. For example, as shown in FIG. 17, transmission of one or more data packets in a frame tail in a video frame A sent by the network device to a terminal device 1 is not completed in a handover process of the terminal device 1.

In this embodiment of this application, there are a plurality of cases in which the network device determines that transmission of one or more data packets in a frame tail in a video frame corresponding to the terminal device is not completed. The cases are not specifically limited to the following cases.

Uncompleted case 1: The network device determines that the network device does not receive one or more data packets in a frame tail in a video frame corresponding to the terminal device from a server.

Uncompleted case 2: The network device receives one or more data packets in a frame tail in a video frame corresponding to the terminal device from the server, but does not complete sending the one or more data packets in the frame tail in the video frame to the terminal device.

Uncompleted case 3: The network device completes sending the one or more data packets in the frame tail in the video frame to the terminal device, but does not receive a reception feedback from the terminal device.

Figure 18:
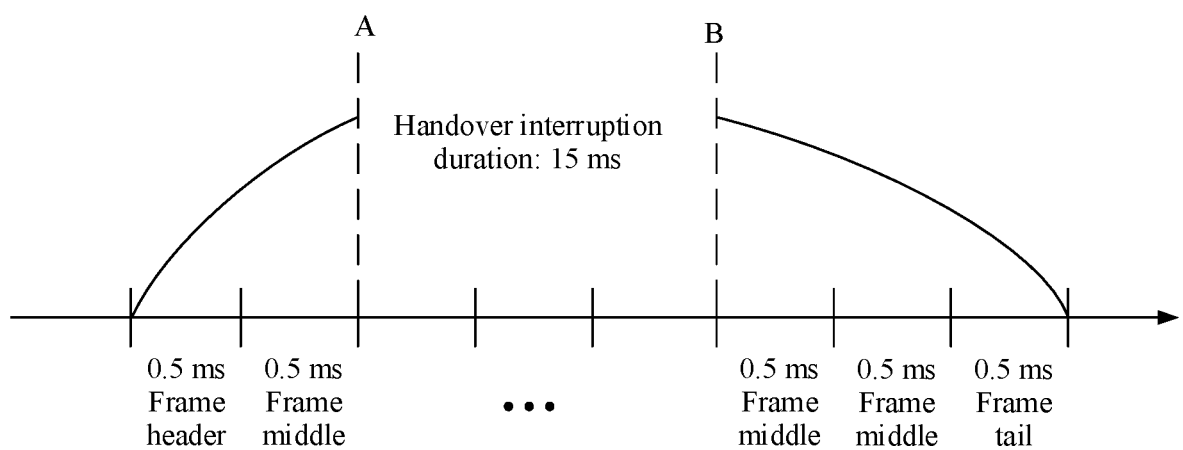
FIG. 18 is a schematic diagram in which existing video frame transmission interruption is caused by cell handover.

For example, as shown in FIG. 18, assuming that the network device sends a batch of data packets to the terminal device every 0.5 ms, a video frame currently sent by the network device to the terminal device may need to be sent five times. If the terminal device needs to perform cell handover after the network device completes sending the second batch of data packets (in other words, at a point A), transmission of the video frame sent by the network device to the terminal device may be interrupted. Assuming that it takes the terminal device 15 ms to complete cell handover (in other words, the terminal device is located at a point B after the handover), the foregoing "frame sending delay" increases by 15 ms. Consequently, a video frame transmission timeout occurs, and even after the terminal device completes the handover, sending cannot be continued, and the video frame is transmitted to the terminal.

Figure 19:
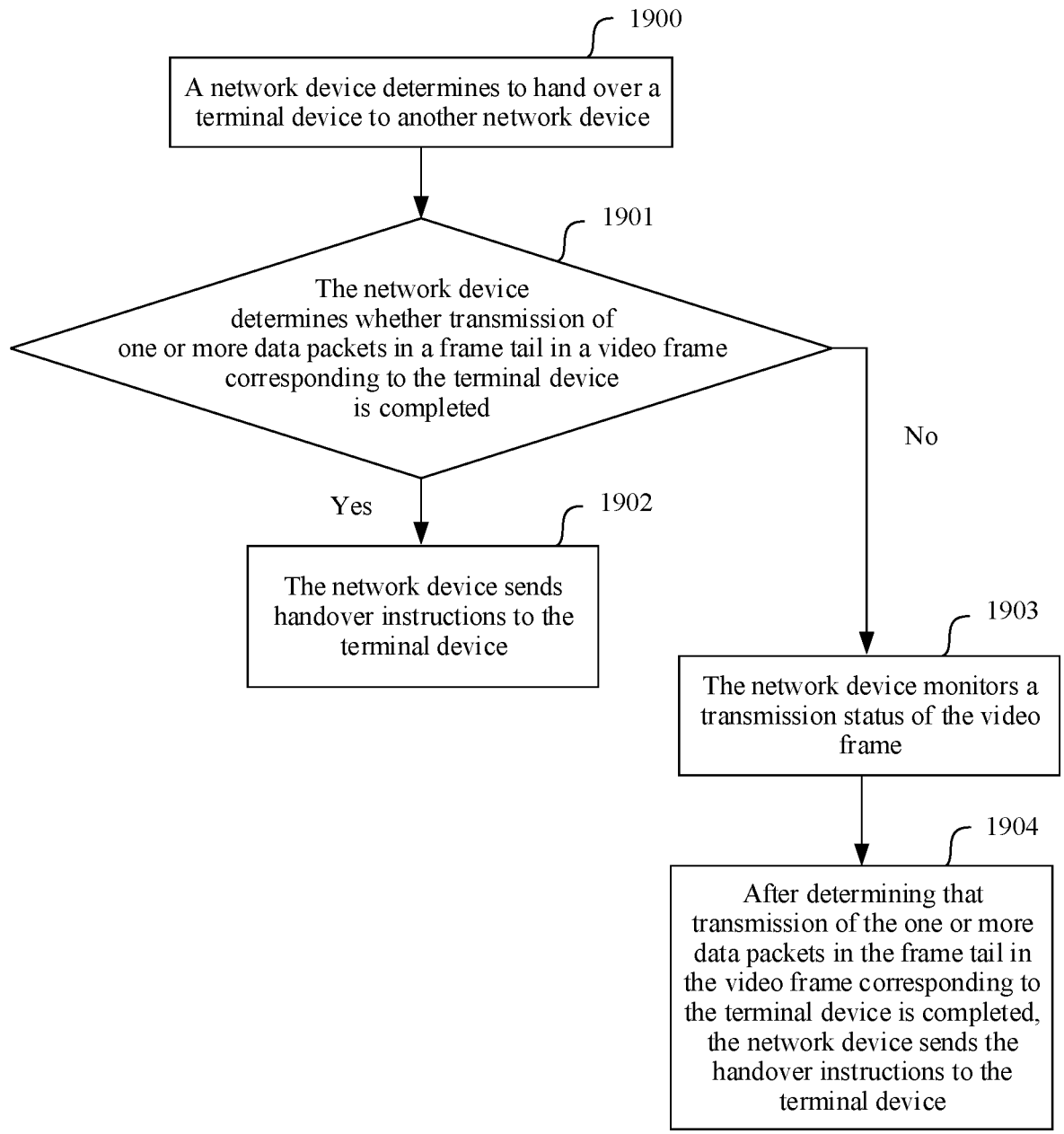
FIG. 19 is a schematic flowchart of a third video data transmission method according to an embodiment of this application.

Therefore, an embodiment of this application further provides a video data transmission method, to resolve a problem that a video frame transmission timeout may occur in a process in which a terminal device performs cell handover. As shown in FIG. 19, specific steps include the following steps.

Step 1900: A network device determines to hand over the terminal device to another network device.

Step 1901: The network device determines whether transmission of the one or more data packets in the frame tail in the video frame corresponding to the terminal device is completed, and if yes, performs step 1902, or if no, performs step 1903.

Step 1902: The network device sends handover instructions to the terminal device.

The handover instructions are used to instruct the terminal device to be handed over from a source cell to a target cell.

Step 1903: The network device monitors a transmission status of the video frame.

Step 1904: After determining that transmission of the one or more data packets in the frame tail in the video frame corresponding to the terminal device is completed, the network device sends the handover instructions to the terminal device.

Figure 20:
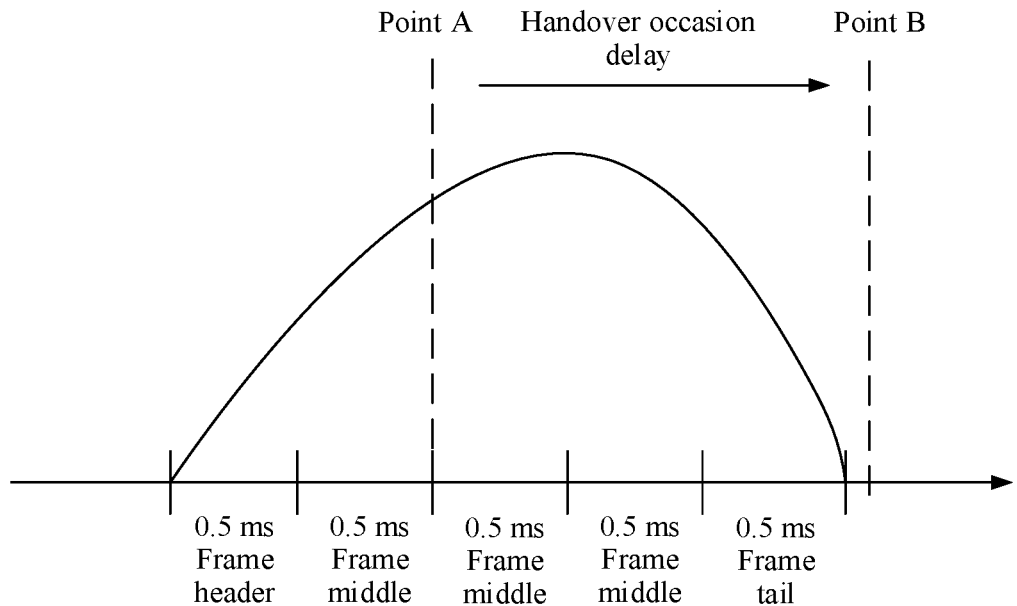
FIG. 20 is a schematic diagram of a scenario in which a network device triggers handover according to an embodiment of this application.

For example, as shown in FIG. 20, the network device determines, at a point A, that the terminal device needs to perform cell handover, and the network device determines that in this case, transmission of the one or more data packets in the frame tail in the video frame is not completed. Therefore, the network device delays a time of sending the handover instructions to the terminal device.

The network device continuously monitors the transmission status of the video frame. Assuming that the network device determines, at a point B, that transmission of the one or more data packets in the frame tail in the video frame corresponding to the terminal device is completed (in other words, no to-be-sent data packet exists in the video frame), the network device sends the handover instructions to the terminal device to instruct the terminal device to be handed over from the source cell to the target cell.

It can be learned from FIG. 20 that duration for which the network device delays sending the handover instructions is approximately 1.5 ms.

Further, in an optional manner of this embodiment of this application, a third duration threshold is set. If the network device still does not complete, after the third duration threshold is reached, transmitting the one or more data packets in the frame tail in the video frame corresponding to the terminal device, the network device sends the handover instructions to the terminal device.

For example, assuming that the third duration threshold is 20 ms, the network device determines that the terminal device needs to perform cell handover, and the network device determines that in this case, transmission of the one or more data packets in the frame tail in the video frame corresponding to the terminal device is not completed, the network device delays sending the handover instructions to the terminal device.

The network device continuously monitors the transmission status of the video frame. If the network device still does not complete, after a delay of 20 ms, transmitting the one or more data packets in the frame tail in the video frame corresponding to the terminal device, the network device sends the handover instructions to the terminal device to instruct the terminal device to be handed over from the source cell to the target cell.

It should be noted that, in this embodiment of this application, the network device may determine the delayed duration in a plurality of manners, the manners are not limited to the foregoing manner in FIG. 19, and any manner of considering delayed duration for cell handover of a terminal device during video transmission performed based on a video frame falls within the protection scope of this application.

Based on the foregoing method, when the terminal device needs to perform cell handover, the network device makes a joint decision based on a signaling plane and a user plane. To be specific, after determining that signal quality between the terminal device and a cell meets a handover condition, the network device further needs to determine whether a video frame being transmitted to the terminal device exists and determine a transmission phase of the video frame. Therefore, time for which delivery of handover instructions is delayed is comprehensively obtained, so that delay performance of the video frame being transmitted is effectively ensured without affecting the cell handover, thereby making a video more fluent.

It may be understood from the foregoing descriptions of the solutions of this application that to implement the foregoing functions, each device includes a hardware structure and/or a software unit corresponding to each function. A person skilled in the art should easily be aware that, in combination with the units and algorithm steps in the examples described in embodiments disclosed in this specification, the present disclosure can be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of the present disclosure.

Figure 21:
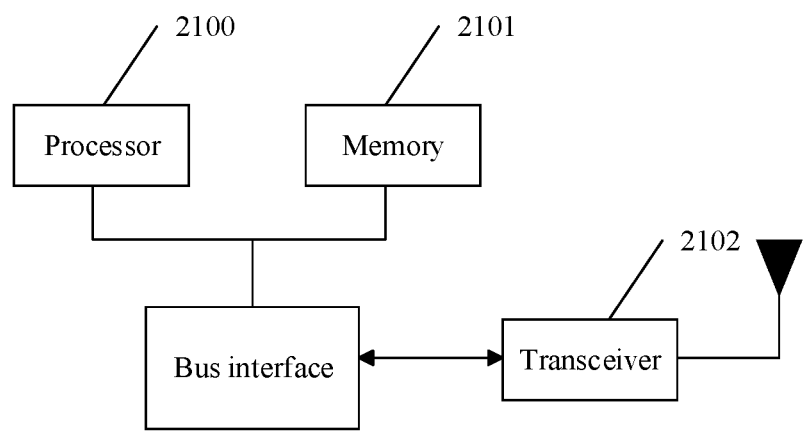
FIG. 21 is a schematic diagram of a first video data transmission apparatus according to this application.

As shown in FIG. 21, an embodiment of the present disclosure provides a video data transmission apparatus. The video data transmission apparatus includes a processor 2100, a memory 2101, and a transceiver 2102.

The processor 2100 is responsible for management of a bus architecture and common processing, and the memory 2101 may store data used when the processor 2100 performs an operation. The transceiver 2102 is configured to receive and send, under control of the processor 2100, data to the memory 2101 for data communication.

The bus architecture may include any quantity of interconnected buses and bridges, and specifically link various circuits of one or more processors represented by the processor 2100 and memories represented by the memory 2101. The bus architecture may further link various other circuits of a peripheral device, a voltage regulator, a power management circuit, and the like together. These are all well-known in the art, and therefore are not further described in this specification. The bus interface provides interfaces. The processor 2100 is responsible for management of a bus architecture and common processing, and the memory 2101 may store data used when the processor 2100 performs an operation.

The procedure disclosed in embodiments of the present disclosure may be applied to the processor 2100 or implemented by the processor 2100. In an implementation process, steps of a safe driving monitoring procedure may be completed by using an integrated logic circuit of hardware in the processor 2100 or instructions in a form of software. The processor 2100 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of the present disclosure. The general-purpose processor may be a microprocessor, or may be any conventional processor or the like. The steps of the methods disclosed with reference to embodiments of the present disclosure may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 2101. The processor 2100 reads information in the memory 2101, and completes steps of a signal processing procedure in combination with hardware of the processor 2100.

In an optional manner of this application, when the video data transmission apparatus is a network device, the processor 2100 is configured to read a program in the memory 2101 and perform a method procedure performed by the network device in S1000 to S1003 shown in FIG. 10, or perform a method procedure performed by the network device in S1400 to S1403 shown in FIG. 14, or perform a method procedure performed by the network device in S1900 to S21904 shown in FIG. 19.

In an optional manner of this application, when the video data transmission apparatus is a terminal device, the processor 2100 is configured to read a program in the memory 2101 and perform a method procedure performed by the terminal device in S1000 to S1003 shown in FIG. 10, or perform a method procedure performed by the terminal device in S1400 to S1403 shown in FIG. 14, or perform a method procedure performed by the terminal device in S1900 to S21904 shown in FIG. 19.

Figure 22:
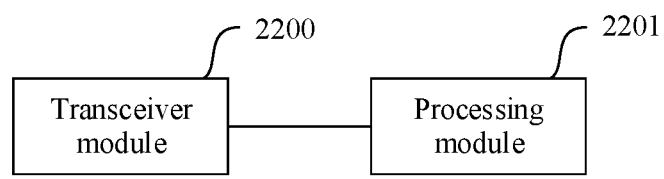
FIG. 22 is a schematic diagram of a second video data transmission apparatus according to this application.

As shown in FIG. 22, the present disclosure provides a video data transmission apparatus. The apparatus may be a network device, and the apparatus includes a transceiver module 2200 and a processing module 2201.

In the video data transmission apparatus provided in this embodiment of this application, in an optional manner, the transceiver module 2200 and the processing module 2201 are configured to perform the following content.

The transceiver module 2200 is configured to receive a plurality of data packets corresponding to a plurality of video frames from a server. Each of the plurality of video frames includes one or more data packets.

The processing module 2201 is configured to: determine a transmission phase of the one or more data packets corresponding to each video frame in the video frame, where the transmission phase includes a frame header, a frame middle, or a frame tail; and determine, based on the transmission phase of the one or more data packets corresponding to each video frame, a priority of the one or more data packets corresponding to each video frame.

The transceiver module 2200 is further configured to send, based on the priority of the one or more data packets corresponding to each video frame, the one or more data packets corresponding to the video frame to a terminal device corresponding to the video frame.

In addition, the transceiver module 2200 in the apparatus is further configured to perform a receiving/sending procedure of the network device in S1000 to S1003 shown in FIG. 10, and the processing module 2201 in the apparatus is further configured to perform a processing procedure of the network device in S1000 to S1003 shown in FIG. 10; or the transceiver module 2200 in the apparatus performs a receiving/sending method procedure of the network device in S1900 to S21904 shown in FIG. 19, and the processing module 2201 in the apparatus performs a processing method procedure of the network device in S1900 to S21904 shown in FIG. 19.

In another optional manner, the transceiver module 2200 and the processing module 2201 are configured to perform the following content.

The transceiver module 2200 is configured to receive a plurality of data packets corresponding to a plurality of video frames from a server. Each of the plurality of video frames includes one or more data packets.

The processing module 2201 is configured to determine, based on a scheduling waiting delay and/or a frame sending delay of the one or more data packets corresponding to each video frame, a priority of the one or more data packets corresponding to each video frame.

The transceiver module 2200 is further configured to send, based on the priority of the one or more data packets corresponding to each video frame, the one or more data packets corresponding to the video frame to a terminal device corresponding to the video frame.

The scheduling waiting delay includes duration between receiving one or more data packets in a frame header in a corresponding video frame by the network device and scheduling the one or more data packets by the network device, and the frame sending delay includes duration between sending one or more data packets in a frame header in a video frame by the network device and scheduling one or more data packets in a frame middle or a frame tail in the video frame by the network device.

In addition, the transceiver module 2200 in the apparatus is further configured to perform a receiving/sending method procedure of the network device in S1400 to S1403 shown in FIG. 14, and the processing module 2201 in the apparatus performs a processing method procedure of the network device in S1400 to S1403 shown in FIG. 14; or the transceiver module 2200 in the apparatus is further configured to perform a receiving/sending method procedure of the network device in S1900 to S21904 shown in FIG. 19, and the processing module 2201 in the apparatus performs a processing method procedure of the network device in S1900 to S21904 shown in FIG. 19.

The foregoing functions of the transceiver module 2200 and the processing module 2201 shown in FIG. 22 may be performed by the processor 2100 by running a program in the memory 2101, or may be separately performed by the processor 2100.

Figure 23:
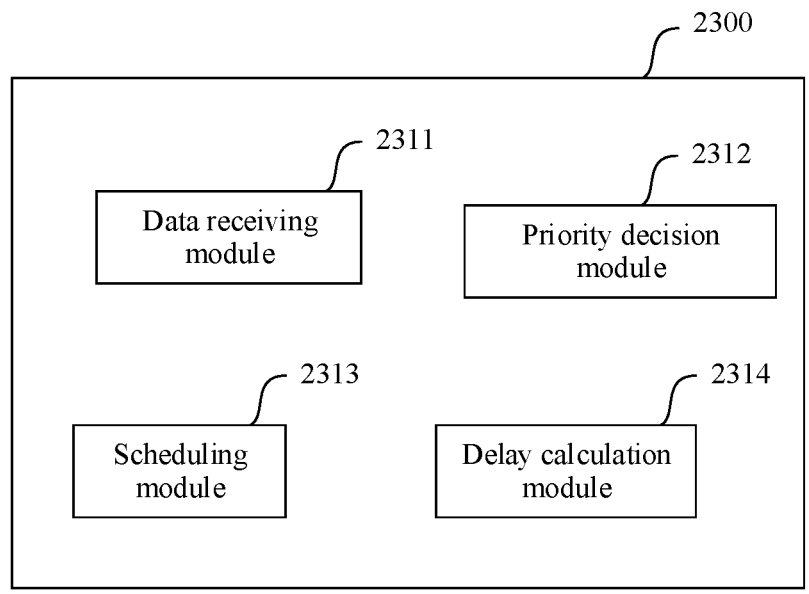
FIG. 23 is a schematic diagram of composition of a network device according to an embodiment of this application.

Further, in an optional manner of embodiments of this application, as shown in FIG. 23, an internal structure of the network device in embodiments of this application may be alternatively in the following form.

The network device includes a data receiving module 2311, a priority decision module 2312, a scheduling module 2313, a delay calculation module 2314, and the like.

The data receiving module 2311 is configured to: receive a video frame of each terminal device from a server, and determine a transmission phase of one or more data packets in the video frame, in other words, determine whether one or more data packets in the video frame belong to a frame header, a frame middle, or a frame tail.

The priority decision module 2312 is configured to increase, based on an existing scheduling priority (for example, determined based on a radio channel or a resource), a priority factor that is based on a transmission batch in which a to-be-sent data packet is located, to implement "frame-level" priority scheduling.

The scheduling module 2313 is configured to schedule a video frame based on a priority obtained through a comprehensive decision.

The delay calculation module 2314 is configured to: calculate a "scheduling waiting delay" and a "frame sending delay" of a corresponding video frame based on scheduled data, and feed back and adjust a subsequent priority of the video frame.

Figure 24:
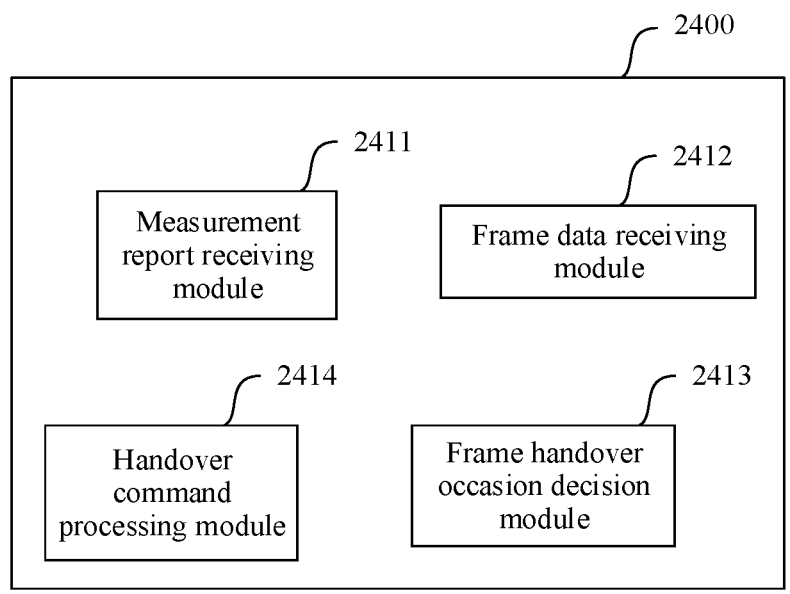
FIG. 24 is a schematic diagram of composition of another network device according to an embodiment of this application.

In another optional manner of embodiments of this application, as shown in FIG. 24, an internal structure of the network device in embodiments of this application may be alternatively in the following form.

The network device includes a measurement report receiving module 2411, a frame data receiving module 2412, a frame handover occasion decision module 2413, a handover command processing module 2414, and the like.

The measurement report receiving module 2411 is configured to: when a terminal learns, through measurement, that signal quality of a source cell and signal quality of a target cell meet a requirement, report a measurement report to a base station to indicate that handover can be currently performed.

The frame data receiving module 2412 is configured to: receive a video frame of each terminal device from a server, and determine a transmission phase of one or more corresponding data packets in the video frame of the terminal device.

The frame handover occasion decision module 2413 is configured to: when measurement meets the handover condition, determine whether transmission of one or more data packets in a frame tail in the video frame corresponding to the terminal device is completed, determine whether to delay a current time of delivering a handover command, and determine how many milliseconds the current time is to be delayed.

The handover command processing module 2414 is configured to: construct the handover command based on a handover time determining result, and deliver the handover command to the terminal, to instruct the terminal to initiate handover.

Optionally, in embodiments of this application, an internal structure of the network device may be a combination of the content in FIG. 23 and FIG. 24.

In some possible implementations, aspects of the video data transmission method provided in embodiments of the present disclosure may be alternatively implemented in a form of a program product. The program product includes program code. When the program code is run on a computer device, the program code is used to enable the computer device to perform the steps in the video data transmission method according to various example implementations of the present disclosure that is described in this specification.

The program product may be any combination of one or more readable media. The readable medium may be a readable signal medium or a readable storage medium. The readable storage medium may be but is not limited to an electrical, magnetic, optical, electromagnetic, infrared, or semiconductor system, apparatus, or device, or any combination thereof. More specific examples (a non-exhaustive list) of the readable storage medium include an electrical connection having one or more wires, a portable disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

The video data transmission program product according to embodiments of the present disclosure may be a portable compact disk read-only memory (CD-ROM) and include program code, and may run on a server device. However, the program product of the present disclosure is not limited thereto. In this document, the readable storage medium may be any tangible medium that includes or stores a program, and the program may be used by or in combination with a video data transmission apparatus or component.

The readable signal medium may include a data signal propagated in a baseband or as a part of a carrier. The data signal carries readable program code. Such a propagated data signal may be in a variety of forms, including but not limited to an electromagnetic signal, an optical signal, or any suitable combination thereof. The readable signal medium may be alternatively any readable medium other than the readable storage medium, and the readable medium may send, propagate, or transmit a program used by or in combination with a periodic network action system, apparatus, or component.

The program code included in the readable medium may be transmitted by using any appropriate medium, including but not limited to a wireless medium, a wired medium, an optical cable, an RF medium, or any appropriate combination thereof.

Program code used to perform operations of the present disclosure may be written in any combination of one or more programming languages, and the programming languages include object-oriented programming languages such as Java and C++, and further include conventional procedural programming languages such as the "C" language or similar programming languages. The program code may be executed completely on a user computing device, partially on user equipment, as an independent software package, partially on a user computing device and partially on a remote computing device, or completely on a remote computing device or server. In cases involving a remote computing device, the remote computing device may be connected to a user computing device through any type of network, including a local area network (LAN) or a wide area network (WAN), or may be connected to an external computing device.

An embodiment of this application further provides a computing device readable storage medium for a video data transmission method. To be specific, content is not lost after power failure. The storage medium stores a software program, including program code. When the program code runs on a computing device, the software program may implement any one of the foregoing video data transmission solutions in embodiments of this application when being read and executed by one or more processors.

The foregoing describes this application with reference to the block diagrams and/or the flowcharts of the method, the apparatus (system), and/or the computer program product according to embodiments of this application. It should be understood that blocks in the block diagrams and/or the flowcharts and a combination of the blocks in the block diagrams and/or the flowcharts may be implemented by using computer program instructions. These computer program instructions may be provided to a processor of a general-purpose computer or a dedicated computer and/or another programmable data processing apparatus to generate a machine, so that the instructions executed by the processor of the computer and/or the another programmable data processing apparatus create a method for implementing a specified function/action in the blocks of the block diagrams and/or the flowcharts.

Correspondingly, this application may be alternatively implemented by using hardware and/or software (including firmware, resident software, microcode, or the like). Still further, in this application, a form of a computer program product on a computer-usable or computer-readable storage medium may be used. The computer program product includes computer-usable or computer-readable program code implemented in a medium, to be used by an instruction execution system or in combination with an instruction execution system. In the contexts of this application, the computer-usable or computer-readable medium may be any medium, and may include, store, communicate, transmit, or transfer a program, to be used by an instruction execution system, apparatus, or device or in combination with an instruction execution system, apparatus, or device.

A plurality of embodiments are described in detail in this application with reference to a plurality of flowcharts, but it should be understood that the flowcharts and related descriptions of corresponding embodiments thereof are merely examples for ease of understanding, and shall not constitute any limitation on this application. Each step in each flowchart does not necessarily need to be performed. For example, some steps may be skipped. In addition, an execution sequence of the steps is not fixed, and is not limited to that shown in the figure. The execution sequence of the steps should be determined based on functions and internal logic thereof.

The plurality of embodiments described in this application may be randomly combined or the steps may be performed in combination. An execution sequence of embodiments and an execution sequence of the steps of embodiments are not fixed, and are not limited to those shown in the figures. The execution sequence of embodiments and the sequence of performing the steps of embodiments in combination should be determined based on functions and internal logic thereof.

Although this application is described with reference to specific features and all embodiments thereof, it is clear that various modifications and combinations may be made to them without departing from the spirit and scope of this application. Correspondingly, this specification and the accompanying drawings are merely example descriptions of this application defined by the appended claims, and are considered as any or all of modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A video data transmission method, wherein the video data transmission method comprises:
   receiving, by a network device, a plurality of data packets corresponding to a plurality of video frames from a server, wherein each of the plurality of video frames comprises one or more data packets;
   determining, by the network device, a transmission phase of the one or more data packets corresponding to each video frame in the plurality of video frames, wherein the transmission phase comprises a frame header, a frame middle, or a frame tail;
   determining, by the network device based on the transmission phase of the one or more data packets corresponding to each video frame, a priority of the one or more data packets corresponding to each video frame;
   sending, by the network device based on the priority of the one or more data packets corresponding to each video frame, the one or more data packets corresponding to each video frame to a terminal device corresponding to each video frame; and
   sending, by the network device, handover instructions to a terminal device after the network device completes transmitting one or more data packets in a frame tail in a video frame corresponding to the terminal device.

2. The video data transmission method according to claim 1, wherein at least one of the following is satisfied:
   a priority of one or more data packets in a frame tail in a corresponding video frame is greater than a priority of one or more data packets in a frame middle or a frame header in the corresponding video frame; or
   a priority of one or more data packets in a frame middle in a corresponding video frame is greater than a priority of one or more data packets in a frame header in the corresponding video frame.

3. The video data transmission method according to claim 1, wherein:
   the determining, by the network device based on the transmission phase of the one or more data packets corresponding to each video frame, a priority of the one or more data packets corresponding to each video frame comprises:
      in response to a determination that the transmission phase of the one or more data packets corresponding to each of the plurality of video frames is a frame header, determining, by the network device, a scheduling waiting delay of the one or more data packets corresponding to each of the plurality of video frames, wherein a priority of one or more data packets corresponding to a video frame with a larger scheduling waiting delay is greater than a priority of one or more data packets corresponding to a video frame with a smaller scheduling waiting delay; and
   the scheduling waiting delay comprises a duration between receiving one or more data packets in a frame header in a corresponding video frame by the network device and scheduling the one or more data packets by the network device.

4. The video data transmission method according to claim 1, wherein:
   the determining, by the network device based on the transmission phase of the one or more data packets corresponding to each video frame, a priority of the one or more data packets corresponding to each video frame comprises:
      in response to a determination that the transmission phase of the one or more data packets corresponding to each of the plurality of video frames is a frame middle or a frame tail, determining, by the network device, a frame sending delay of the one or more data packets corresponding to each of the plurality of video frames, wherein a priority of one or more data packets corresponding to a video frame with a larger frame sending delay is greater than a priority of one or more data packets corresponding to a video frame with a smaller frame sending delay; and
   the frame sending delay comprises a duration between sending one or more data packets in a frame header in a video frame by the network device and scheduling one or more data packets in a frame middle or a frame tail in the video frame by the network device.

5. The video data transmission method according to claim 1, wherein the sending, by the network device, handover instructions to a terminal device after the network device completes transmitting one or more data packets in a frame tail in a video frame corresponding to the terminal device comprises:
   determining, by the network device, to hand over the terminal device to another network device;
   determining, by the network device, whether transmission of the one or more data packets in the frame tail in the video frame corresponding to the terminal device is completed; and
   after transmission of the one or more data packets in the frame tail in the video frame corresponding to the terminal device is completed, sending, by the network device, a handover command to the terminal device.

6. A video data transmission method, wherein the video data transmission method comprises:
   receiving, by a network device, a plurality of data packets corresponding to a plurality of video frames from a server, wherein each of the plurality of video frames comprises one or more data packets;
   determining, by the network device based on at least one of a scheduling waiting delay or a frame sending delay of the one or more data packets corresponding to each video frame, a priority of the one or more data packets corresponding to each video frame; and
   sending, by the network device based on the priority of the one or more data packets corresponding to each video frame, the one or more data packets corresponding to each video frame to a terminal device corresponding to each video frame, wherein:
      the one or more data packets corresponding to each video frame are in a transmission phase comprising a frame header, a frame middle, or a frame tail in the video frame; and
      the one or more data packets are in a frame header in the corresponding video frame, a scheduling waiting delay of the one or more data packets corresponding to the video frame comprises a duration between receiving the one or more data packets by the network device and scheduling the one or more data packets by the network device; or the one or more data packets are in a frame middle or a frame tail in the corresponding video frame, a frame sending delay of the one or more data packets corresponding to the video frame comprises a duration between sending one or more data packets in a frame header in the video frame by the network device and scheduling the one or more data packets in the frame middle or the frame tail in the video frame by the network device; and sending, by the network device, handover instructions to a terminal device after the network device completes transmitting one or more data packets in a frame tail in a video frame corresponding to the terminal device.

7. The video data transmission method according to claim 6, wherein:
a priority of one or more data packets corresponding to a video frame with a larger scheduling waiting delay is greater than a priority of one or more data packets corresponding to a video frame with a smaller scheduling waiting delay; and
a priority of one or more data packets corresponding to a video frame with a larger frame sending delay is greater than a priority of one or more data packets corresponding to a video frame with a smaller frame sending delay.

8. The video data transmission method according to claim 6, wherein
in response to a determination that a frame sending delay of the one or more data packets corresponding to each of the plurality of video frames is the same, determining, by the network device, a transmission phase of the one or more data packets corresponding to each of the plurality of video frames, wherein a priority of one or more data packets in a frame tail in a corresponding video frame is greater than a priority of one or more data packets in a frame middle in the corresponding video frame.

9. The video data transmission method according to claim 7, wherein
a priority of one or more data packets corresponding to a video frame with a frame sending delay is greater than a priority of one or more data packets corresponding to a video frame with a scheduling waiting delay.

10. The video data transmission method according to claim 7, wherein:
a priority of one or more data packets corresponding to a video frame whose scheduling waiting delay reaches a first duration threshold is greater than a priority of one or more data packets corresponding to a video frame whose frame sending delay does not reach a second duration threshold, wherein:
the first duration threshold is maximum duration between receiving one or more data packets in a frame header in a corresponding video frame by the network device and scheduling the one or more data packets by the network device, and
the second duration threshold is maximum duration between sending one or more data packets in a frame header in a video frame by the network device and scheduling one or more data packets in a frame middle or a frame tail in the video frame by the network device.

11. The video data transmission method according to claim 6, wherein the sending, by the network device, handover instructions to a terminal device after the network device completes transmitting one or more data packets in a frame tail in a video frame corresponding to the terminal device comprises:
determining, by the network device, to hand over the terminal device to another network device;
determining, by the network device, whether transmission of the one or more data packets in the frame tail in the video frame corresponding to the terminal device is completed; and
after transmission of the one or more data packets in the frame tail in the video frame corresponding to the terminal device is completed, sending, by the network device, a handover command to the terminal device.

12. A video data transmission apparatus, comprising:
at least one processor; and
one or more memories coupled to the at least one processor and storing programming instructions for execution by the at least one processor to:
receive a plurality of data packets corresponding to a plurality of video frames from a server, wherein each of the plurality of video frames comprises one or more data packets;
determine a transmission phase of the one or more data packets corresponding to each video frame in the plurality of video frames, wherein the transmission phase comprises a frame header, a frame middle, or a frame tail;
determine, based on the transmission phase of the one or more data packets corresponding to each video frame, a priority of the one or more data packets corresponding to each video frame;
send, based on the priority of the one or more data packets corresponding to each video frame, the one or more data packets corresponding to each video frame to a terminal device corresponding to each video frame; and
send handover instructions to a terminal device after the video data transmission apparatus completes transmitting one or more data packets in a frame tail in a video frame corresponding to the terminal device.

13. The video data transmission apparatus according to claim 12, wherein:
a priority of one or more data packets in a frame tail in a corresponding video frame is greater than a priority of one or more data packets in a frame middle or a frame header in the corresponding video frame.

14. The video data transmission apparatus according to claim 12, wherein:
a priority of one or more data packets in a frame middle in a corresponding video frame is greater than a priority of one or more data packets in a frame header in the corresponding video frame.

15. The video data transmission apparatus according to claim 12, wherein:
the determine, based on the transmission phase of the one or more data packets corresponding to each video frame, a priority of the one or more data packets corresponding to each video frame comprises:
in response to a determination that the transmission phase of the one or more data packets corresponding to each of the plurality of video frames is a frame header, determine a scheduling waiting delay of the one or more data packets corresponding to each of the plurality of video frames, wherein a priority of one or more data packets corresponding to a video frame with a larger scheduling waiting delay is greater than a priority of one or more data packets corresponding to a video frame with a smaller scheduling waiting delay; and the scheduling waiting delay comprises a duration between receiving one or more data packets in a frame header in a corresponding video frame by the video data transmission apparatus and scheduling the one or more data packets by the video data transmission apparatus.

16. The video data transmission apparatus according to claim 12, wherein:

the determine, based on the transmission phase of the one or more data packets corresponding to each video frame, a priority of the one or more data packets corresponding to each video frame comprises:

in response to a determination that the transmission phase of the one or more data packets corresponding to each of the plurality of video frames is a frame middle or a frame tail, determine a frame sending delay of the one or more data packets corresponding to each of the plurality of video frames, wherein a priority of one or more data packets corresponding to a video frame with a larger frame sending delay is greater than a priority of one or more data packets corresponding to a video frame with a smaller frame sending delay; and the frame sending delay comprises a duration between sending one or more data packets in a frame header in a video frame by the video data transmission apparatus and scheduling one or more data packets in a frame middle or a frame tail in the video frame by the video data transmission apparatus.

17. The video data transmission apparatus according to claim 12, wherein send handover instructions to a terminal device after the video data transmission apparatus completes transmitting one or more data packets in a frame tail in a video frame corresponding to the terminal device comprises:

determine to hand over the terminal device to another network device;

determine whether transmission of the one or more data packets in the frame tail in the video frame corresponding to the terminal device is completed; and after transmission of the one or more data packets in the frame tail in the video frame corresponding to the terminal device is completed, send a handover command to the terminal device.

18. The video data transmission method according to claim 1, further comprising:

determining, by the network device, a scheduling waiting delay or a frame sending delay of the one or more data packets corresponding to each video frame.

19. The video data transmission method according to claim 6, further comprising:

determining, by the network device, a transmission phase of the one or more data packets corresponding to each video frame in the plurality of video frames, wherein the transmission phase comprises a frame header, a frame middle, or a frame tail.

20. The video data transmission apparatus according to claim 12, wherein the one or more memories stores programming instructions for execution by the at least one processor to:

determine a scheduling waiting delay or a frame sending delay of the one or more data packets corresponding to each video frame.

* * * * *